United States Patent
Li

(10) Patent No.: US 11,588,709 B2
(45) Date of Patent: Feb. 21, 2023

(54) METHOD, DEVICE AND SYSTEM FOR ENSURING SERVICE LEVEL AGREEMENT OF APPLICATION

(71) Applicant: Huawei Technologies Co., Ltd., Shenzhen (CN)

(72) Inventor: Zhuoming Li, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/986,500

(22) Filed: Aug. 6, 2020

(65) Prior Publication Data

US 2020/0366567 A1    Nov. 19, 2020

Related U.S. Application Data

(63) Continuation of application No. PCT/CN2019/074325, filed on Feb. 1, 2019.

(30) Foreign Application Priority Data

Feb. 6, 2018 (CN) .......................... 201810117803.3

(51) Int. Cl.
*H04L 29/08* (2006.01)
*H04L 41/5003* (2022.01)
(Continued)

(52) U.S. Cl.
CPC ...... *H04L 41/5003* (2013.01); *H04L 41/5019* (2013.01); *H04L 47/805* (2013.01)

(58) Field of Classification Search
CPC .......................... H04L 41/5003; H04L 41/5019
See application file for complete search history.

(56) References Cited

U.S. PATENT DOCUMENTS

2002/0124103 A1    9/2002 Maruyama et al.
2017/0303259 A1    10/2017 Lee et al.
(Continued)

FOREIGN PATENT DOCUMENTS

CN    103686951 A    3/2014
CN    106657194 A    5/2017
(Continued)

OTHER PUBLICATIONS

3GPP TR 23.786 V0.3.0, Jan. 2018, "3rd Generation Partnership Project; Technical Specification Group Services and System Aspects; Study on architecture enhancements for EPS and 5G System to support advanced V2Xservices (Release 16)," 19 pages.
(Continued)

*Primary Examiner* — Adnan M Mirza
(74) *Attorney, Agent, or Firm* — Conley Rose, P.C.

(57) ABSTRACT

A method, device, and system for ensuring a service level agreement (SLA) of an application, where the method includes: obtaining, by an application function (AF) entity, information about a first network slice instance (NSI) that is in network slice instances between a specified location and a target network and whose SLA support capability meets a subscribed SLA requirement of the application, and sending a notification message including the information about the first NSI, where the notification message includes the information about the first NSI, to establish a new session in the first NSI for a terminal.

30 Claims, 12 Drawing Sheets

(51) Int. Cl.
*H04L 41/5019* (2022.01)
*H04L 47/80* (2022.01)

(56) References Cited

U.S. PATENT DOCUMENTS

| | | | |
|---|---|---|---|
| 2017/0339688 A1 | 11/2017 | Singh et al. | |
| 2018/0062945 A1 | 3/2018 | Ni et al. | |
| 2018/0310169 A1* | 10/2018 | Wang | H04L 61/2007 |
| 2018/0316564 A1* | 11/2018 | Senarath | H04L 41/12 |

FOREIGN PATENT DOCUMENTS

| | | |
|---|---|---|
| CN | 106937362 A | 7/2017 |
| CN | 107040481 A | 8/2017 |
| CN | 107395388 A | 11/2017 |
| CN | 107624230 A | 1/2018 |
| EP | 2592789 B1 | 11/2014 |
| KR | 20020068270 A | 8/2002 |
| KR | 20170119296 A | 10/2017 |
| WO | 2017113109 A1 | 7/2017 |
| WO | 2017140356 A1 | 8/2017 |
| WO | 2017140375 A1 | 8/2017 |
| WO | 2017143047 A1 | 8/2017 |
| WO | 2017154728 A1 | 9/2017 |

OTHER PUBLICATIONS

3GPP TR 32.899 V15.0.0, Jan. 2018, "3rd Generation Partnership Project; Technical Specification Group Services and System Aspects; Telecommunication management;Charging management; Study on charging aspects of 5G system architecture phase 1 (Release 15)," 104 pages.

3GPP TS 23.501 V15.0.0, Dec. 2017, "3rd Generation Partnership Project; Technical Specification Group Services and System Aspects; System Architecture for the 5G System; Stage 2 (Release 15)," 181 pages.

3GPP TS 23.502 V15.0.0, Dec. 2017, "3rd Generation Partnership Project; Technical Specification Group Services and System Aspects; Procedures for the 5G System; Stage 2 (Release 15)," 257 pages.

3GPP TS 23.503 V15.0.0, Dec. 2017, "3rd Generation Partnership Project; Technical Specification Group Services and System Aspects; Policy and Charging Control Framework for the 5G System; Stage 2 (Release 15)," 56 pages.

3GPP TS 28.530 3GPP TS 28.530 V0.4.0, Dec. 2017, "3rd Generation Partnership Project; Technical Specification Group Services and System Aspects; Telecommunication management; Management of 5G networks and network slicing; Concepts, use cases and requirements (Release 15)," 27 pages.

* cited by examiner

METHOD, DEVICE AND SYSTEM FOR ENSURING SERVICE LEVEL AGREEMENT OF APPLICATION

CROSS-REFERENCE TO RELATED APPLICATIONS

This application is a continuation of International Patent Application No. PCT/CN2019/074325, filed on Feb. 1, 2019, which claims priority to Chinese Patent Application No. 201810117803.3, filed on Feb. 6, 2018. The disclosures of the aforementioned applications are hereby incorporated by reference in their entireties.

TECHNICAL FIELD

Embodiments of this application relate to the field of communications technologies, and in particular, to a method, device and system for ensuring a service level agreement (SLA) of an application.

BACKGROUND

In a $5^{th}$ Generation (5G) mobile communications network (5G network), to meet service requirements of different customers (for example, service providers or tenants), a concept of network slicing is proposed. A customer may send a subscription request to an operator to subscribe to a network slice that can meet a specific service requirement. After receiving the subscription request sent by the customer, the operator deploys one or more network slice instances on an infrastructure based on the subscription request of the customer, to carry a service requested by the customer. The customer may use the network slice instance deployed by the operator, and provide an application service for a terminal via a protocol data unit (PDU) session provided in the network slice instance. When the customer subscribes to the network slice from the operator, an order further includes a service level agreement that is agreed on by the two parties. After providing the network slice instance for the customer, the operator needs to ensure that a service level of a service application meets a series of service level objectives required by the service level agreement.

Each network slice instance may include a plurality of user plane function (UPF) entities, and different UPF entities may correspond to different PDU sessions. When the customer is using a network slice instance, an application function (AF) entity may obtain terminal-related running data on each network function entity in the network slice instance, and switch an application to an appropriate UPF entity in the network slice instance based on the obtained running data, to maximally meet a subscribed SLA requirement of the application.

However, due to complexity of a communications environment and mobility of the terminal, a service capability of the network slice instance currently accessed by the customer may no longer meet the subscribed SLA requirement of the application. In this case, even if the application is switched to another UPF in the foregoing manner, the subscribed SLA requirement of the application may not be met, affecting communication quality of the application.

SUMMARY

Embodiments of this application provide a method, device, and system for ensuring a service level agreement of an application, and improving communication quality.

To achieve the foregoing objective, the following technical solutions are used in the embodiments of this application.

According to a first aspect, an embodiment of this application provides a method for ensuring a service level agreement SLA of an application. The method includes: obtaining, by an application function (AF) entity, information about a first network slice instance (NSI) that is in network slice instances (NSIs) between a specified location and a target network and whose SLA support capability meets a subscribed SLA requirement of an application; and sending a notification message carrying the information about the first NSI. As such, another network function entity establishes a new PDU session in the first NSI for a terminal based on the information about the first NSI. According to the method for ensuring a service level agreement of an application provided in this embodiment of this application, the AF entity obtains the information about the NSI whose SLA support capability meets the subscribed SLA requirement of the application between the specified location and the target network, and sends the information about the NSI to another network function entity, to establish a PDU session in the NSI for the terminal. The terminal accesses an application server via the PDU session, and obtains an application service provided by the application server. SLA support capability information of the NSI obtained by the AF entity meets the subscribed SLA requirement of the application, and therefore, after the terminal accesses the application server via the PDU session established in the NSI, a service level of the application can be well ensured.

In a possible design, the AF entity obtains SLA support capability information of the first NSI from SLA support capability information of at least one NSI obtained by a network slice selection function (NSSF) entity or a network data analytics function (NWDAF) entity. For example, the AF entity: sends a slice information request to the network side entity (the NSSF entity or the NWDAF entity); receives a slice information response sent by the network side entity, where the slice information response includes SLA support capability information of at least one NSI between the specified location and the target network; and obtains, from the SLA support capability information of the at least one NSI based on a subscribed SLA of the application and the SLA support capability information of the at least one NSI, the information about the first NSI that meets the subscribed SLA requirement of the application.

The slice information request includes information about a user using the application, location information of the specified location, and an identifier of the target network. Alternatively, the slice information request includes information about a user using the application, location information of the specified location, an identifier of the target network, and subscribed single network slice selection assistance information (S-NSSAI) of the application. Therefore, the AF entity may obtain, from the NSSF entity or the NWDAF entity, the SLA support capability information that can represent an overall service level of the NSI.

In a possible design, when the AF entity detects that an SLA support capability of an NSI currently accessed by the terminal does not meet the subscribed SLA requirement of the application between the specified location and the target network; or the AF entity detects that the terminal moves; or the AF entity receives a capability notification message that is sent by the application server and that is used to notify the AF entity that an SLA support capability of an NSI currently accessed by the terminal does not meet the subscribed SLA requirement of the application between the specified location and the target network, the AF entity is triggered to obtain the information about the first NSI that is in network slice instances (NSIs) between the specified location and the target network and whose SLA support capability meets the subscribed SLA requirement of the application. Therefore, the AF entity obtains the information about the first NSI only in some special cases, thereby reducing power consumption of the AF entity.

In a possible implementation, the method further includes: receiving, by the AF entity, an SLA assurance request sent by the application server, where the SLA assurance request is used to request the AF entity to ensure the service level of the application, and where the SLA assurance request includes the subscribed SLA of the application. The SLA assurance request further includes information about a specific user or user group, where the information about the specific user or user group is used to indicate the AF entity to ensure a service level of an application of a related user. Additionally, the related user is determined based on the information about the specific user or user group. In this way, the application server may authorize the AF entity to perform a function of ensuring a service level agreement of an application, and the AF entity ensures a service level of an application of the specific user or user group.

In a possible design, the information about the first NSI includes an identifier (ID) of the first NSI and S-NSSAI corresponding to the first NSI. The notification message is used to trigger establishment of a new PDU session. The sending, by the AF entity, a notification message includes sending, by the AF entity, the notification message to an AMF entity. After receiving the notification message, the AMF entity stores a correspondence between the ID of the first NSI and the S-NSSAI corresponding to the first NSI, and sends, to the terminal based on the information about the user, a session establishment indication that carries the S-NSSAI corresponding to the first NSI. After receiving the session establishment indication, the terminal updates S-NSSAI that is used by an application and that is configured locally to the S-NSSAI corresponding to the first NSI, and sends, to the AMF entity, a session establishment request that carries the S-NSSAI corresponding to the first NSI. After receiving the request, the AMF entity selects, based on the correspondence that is between the ID of the first NSI and the S-NSSAI corresponding to the first NSI and that is stored in the AMF entity, a session management function (SMF) entity in the first NSI to establish a new PDU session, and the NSSF entity does not need to notify the AMF entity of a slice selection result.

In a possible design, the information about the first NSI is the S-NSSAI corresponding to the first NSI. The notification message is used to trigger establishment of a new PDU session. The sending, by the AF entity, a notification message includes sending, by the AF entity, the notification message to the AMF entity. In a possible design, the information about the first NSI includes the ID of the first NSI and the S-NSSAI corresponding to the first NSI. The notification message is used to trigger establishment of a new protocol data unit PDU session. The sending, by the AF entity, a notification message includes sending, by the AF entity, the notification message to the AMF entity. After receiving the notification message, the AMF entity stores a correspondence between the ID of the first NSI and the S-NSSAI corresponding to the first NSI, and sends, to the terminal based on the information about the user, a session establishment indication that carries the S-NSSAI corresponding to the first NSI. After receiving the session establishment indication, the terminal updates the S-NSSAI that is used by the application and that is configured locally to the S-NSSAI corresponding to the first NSI, and sends, to the AMF entity, a session establishment request that carries the S-NSSAI corresponding to the first NSI. After receiving the request, the AMF entity selects, based on the correspondence that is between the ID of the first NSI and the S-NSSAI corresponding to the first NSI and that is stored in the AMF entity, an SMF entity in the first NSI to establish a new PDU session. In this case, the NSSF entity does not need to notify the AMF entity of the slice selection result.

In a possible design, the information about the first NSI is the S-NSSAI corresponding to the first NSI. The notification message is used to notify to update, using the S-NSSAI corresponding to the first NSI, the S-NSSAI corresponding to the application on the terminal, and trigger establishment of a new PDU session. The notification message further includes the information about the user and an identifier of the application. The sending, by the AF entity, a notification message includes: sending, by the AF entity, the notification message to the AMF entity. After receiving the notification message, the AMF entity sends a configuration update indication and a session establishment indication to the terminal based on the information about the user. The terminal receives the configuration update indication, updates, based on the identifier of the application and the S-NSSAI corresponding to the first NSI, the S-NSSAI that corresponds to the application and that is configured locally to the S-NSSAI corresponding to the first NSI, and sends, to the AMF entity based on the session establishment indication, a session establishment request that carries the S-NSSAI corresponding to the first NSI. The AMF entity selects, based on the slice selection result from the NSSF entity, an SMF entity in the first NSI to establish a new PDU session.

In a possible design, the information about the first NSI is the S-NSSAI corresponding to the first NSI. The notification message is used to notify to update, using the S-NSSAI corresponding to the first NSI, the S-NSSAI corresponding to the application on the terminal. The notification message further includes the information about the user and the identifier of the application. The sending, by the AF entity, a notification message includes sending, by the AF entity, the notification message to the AMF entity. After receiving the notification message, the AMF entity sends, to the terminal based on the information about the user, a configuration update indication including the identifier of the application and the S-NSSAI corresponding to the first NSI. The terminal receives the configuration update indication, updates, based on the identifier of the application and the S-NSSAI corresponding to the first NSI, the S-NSSAI that corresponds to the application and that is configured locally to the S-NSSAI corresponding to the first NSI, and sends a configuration update response to the AF entity via the AMF entity. The AF entity receives the configuration update response, and sends a session establishment indication to the terminal via the AMF entity or the application server. The terminal receives the session establishment indication, and sends, to the AMF entity, a session establishment request that carries the updated S-NSSAI (namely, the S-NSSAI corresponding to the first NSI) corresponding to the application. The AMF entity selects, based on the slice selection result from the NSSF entity, an SMF entity in the first NSI to establish a new PDU session.

In a possible design, the information about the first NSI is the S-NSSAI corresponding to the first NSI. The notification message is used to notify to update an NSSP of the terminal, and the notification message further includes the information about the user and the identifier of the application. The sending, by the AF entity, a notification message includes sending, by the AF entity, the notification message to a unified data management (UDM) entity. After receiving the notification message, the UDM entity updates the NSSP of the terminal based on the identifier of the application and the S-NSSAI corresponding to the first NSI, and sends an NSSP update indication to the terminal via the AMF entity. The NSSP update indication is used to indicate the terminal to update the NSSP configured in the terminal, and the NSSP update indication includes an updated NSSP. The terminal receives the NSSP update indication, and updates the NSSP configured in the terminal. The UDM entity sends an NSSP update response to the AF entity. The AF entity receives the NSSP update response, and sends a session establishment indication to the terminal via the AMF entity or the application server. The terminal receives the session establishment indication, and sends, to the AMF entity, a session establishment request that carries the S-NSSAI corresponding to the first NSI. The AMF entity selects, based on the slice selection result from the NSSF entity, an SMF entity in the first NSI to establish a new PDU session. The session establishment indication is used to indicate the terminal to establish a new PDU session, and the session establishment indication includes the identifier of the application.

In a possible design, the information about the first NSI is the ID of the first NSI. The notification message is used to notify the NSSF entity to specify an NSI for the terminal, and the notification message further includes the information about the user and S-NSSAI currently used by the application. The sending, by the AF entity, a notification message includes sending, by the AF entity, the notification message to the NSSF entity. After receiving the notification message, the NSSF entity generates a slice selection control request record based on the information about the user and the S-NSSAI currently used by the application, associates the information about the user, the S-NSSAI currently used by the application, and the ID of the first NSI, and then sends a slice selection control response to the AF entity. After receiving the slice selection control response, the AF entity sends a session establishment indication to the terminal via the AMF entity or the application server. The terminal receives the session establishment indication, sends, to the AMF entity, the session establishment request that carries the S-NSSAI currently used by the application and the information about the user, and sends a slice selection request that carries the S-NSSAI currently used by the application and the information about the user to the NSSF entity. The NSSF entity selects the first NSI based on a previously generated record, and sends a slice selection result to the AMF entity. The AMF entity selects, based on the slice selection result from the NSSF entity, an SMF entity in the first NSI to establish a new PDU session.

In a possible design, the method further includes: determining, by the AF entity, that no NSI between the specified location and the target network meets the subscribed SLA requirement of the application; and sending a mode switching notification to the terminal, wherein the mode switching notification comprises an identifier of a target working mode or indication information indicating that there is no NSI meeting the subscribed SLA requirement of the application, where the mode switching notification includes an identifier of a target working mode. For example, there may be several preset different working modes for communication between the terminal and the application server, and each working mode has a different requirement on a service level supported by a network. If there is no NSI meeting an SLA requirement of an application in a current working mode, the application may be switched to another working mode, to lower a requirement on a service level supported by the network, and enable the switched working mode to meet SLA support capability information of an NSI currently accessed by the terminal.

According to a second aspect, a method for ensuring a service level agreement of an application is provided. The method includes: receiving, by a terminal, a mode switching notification; and switching, by the terminal, a working mode of an application to a target working mode based on the mode switching notification. According to the method for ensuring a service level agreement of an application provided in this embodiment of this application, the terminal decreases a level of a working mode by switching the working mode of the application to a working mode that meets a subscribed SLA requirement of the application, to meet a service level of the application.

In a possible design, the mode switching notification includes an identifier of the target working mode or indication information indicating that no NSI meets the subscribed SLA requirement of the application. The terminal may switch the working mode of the application to the target working mode based on the identifier of the target working mode. Alternatively, the terminal determines, based on the indication information indicating that there is no NSI meeting the subscribed SLA requirement of the application, to establish a new PDU session or switch the working mode of the application to the target working mode.

In a possible design, the receiving, by a terminal, a mode switching notification includes receiving, by the terminal, the mode switching notification sent by an AF entity or an application server. Therefore, the AF entity may notify the terminal to switch the mode, to ensure the service level of the application. Alternatively, the application server switches the mode, to ensure the service level of the application. This improves flexibility in an execution body for ensuring the service level of the application.

According to a third aspect, a method for ensuring a service level agreement of an application is provided. The method includes: receiving, by a network side entity, a slice information request sent by an AF entity; and sending a slice information response to the AF entity, where the slice information response includes SLA support capability information of at least one network slice instance between a specified location and a target network. According to the method for ensuring a service level agreement of an application provided in this embodiment of this application, the network side entity sends, to the AF entity, the SLA support capability information that represents an overall service level of an NSI. As such, the AF entity makes a corresponding decision based on the SLA support capability information of the NSI, and establishes a new PDU session on the NSI that meets an SLA requirement of an application. Alternatively, the AF entity sends the SLA support capability information of the NSI to an application server, and the application server determines to establish a new PDU session on the NSI that meets the SLA requirement of the application, to ensure a service level of the application.

In a possible design, the slice information request includes information about a user using the application, location information of the specified location, and an identifier of the target network. In this case, the network side entity may obtain, from a UDM entity, subscribed S-NSSAI of the application. Alternatively, the slice information request includes information about a user using the application, location information of the specified location, an identifier of the target network, and subscribed S-NSSAI of the application. In this case, the AF entity sends the subscribed S-NSSAI of the application to the network side entity, and the network side entity does not need to obtain the subscribed S-NSSAI of the application from the UDM entity. This reduces power consumption of the network side entity.

In a possible design, the network side entity is an NSSF entity or an NWDAF entity. In this way, the SLA support capability information of the NSI may be obtained by different entities.

In a possible design, when the network side entity is the NSSF entity, before receiving a slice information request sent by an AF entity, the method further includes: receiving configuration information entered by an operator; and obtaining SLA support capability information of each NSI in a network from the configuration information, where the configuration information includes the SLA support capability information of each NSI in the network. Alternatively, the method further includes: obtaining, from the NWDAF entity, terminal-related running data on each network function entity in each NSI in a network and service load information of the NSI in each deployment area; and determining the SLA support capability information of the NSI based on the obtained running data and the service load information. Alternatively, the method further includes: obtaining running information of each network function entity in the NSI from a network repository function (NRF) entity in the NSI; and determining the SLA support capability information of the NSI based on the running information. Therefore, the NSSF entity may obtain, dynamically or through static configuration, the SLA support capability information of the NSI in the network.

In a possible design, when the network side entity is the NWDAF entity, before receiving a slice information request sent by an AF entity, the method further includes: collecting terminal-related running data on each network function entity in the NSI and service load information of the NSI in each deployment area; and determining the SLA support capability information of the NSI based on the obtained running data and the service load information. Alternatively, the method further includes: obtaining running information of each network function entity in the NSI from an NRF entity in the NSI; and determining the SLA support capability information of the NSI based on the running information. Therefore, the NWDAF entity may dynamically obtain the SLA support capability information of the NSI in the network.

According to a fourth aspect, an AF entity is provided. The AF entity may implement a function performed by the AF entity in the foregoing method embodiments. The function may be implemented using hardware, or may be implemented using hardware executing corresponding software. The hardware or the software includes one or more modules corresponding to the functions. For example, the AF entity may include an obtaining unit configured to obtain information about a first NSI that is in network slice instances between a specified location and a target network and whose SLA support capability meets a subscribed SLA requirement of an application. The AF entity may further include a sending unit configured to send a notification message, where the notification message includes the information about the first NSI obtained by the obtaining unit.

For an implementation of the AF entity, refer to the behaviors and functions of the AF entity in the method for ensuring a service level agreement of an application provided in the first aspect or the possible implementations of the first aspect. Details are not described herein again. Therefore, the provided AF entity may achieve same beneficial effects as those in the first aspect.

According to a fifth aspect, an AF entity is provided, including a processor and a memory. The memory is configured to store a computer-executable instruction. When the AF entity runs, the processor executes the computer-executable instruction stored in the memory, and the AF entity is enabled to perform the method for ensuring a service level agreement of an application according to any one of the possible implementations of the first aspect.

According to a sixth aspect, a computer-readable storage medium is provided. The computer-readable storage medium stores an instruction. When the instruction is run on a computer, the computer is enabled to perform the method for ensuring a service level agreement of an application according to any one of the implementations of the first aspect.

According to a seventh aspect, a computer program product including an instruction is provided. When the computer program product runs on a computer, the computer is enabled to perform the method for ensuring a service level agreement of an application according to any one of the implementations of the first aspect.

According to an eighth aspect, a chip system is provided. The chip system includes a processor configured to support an AF entity in implementing the functions in the foregoing aspects, for example, support the AF entity in obtaining information about a first NSI that is in network slice instances between a specified location and a target network and whose SLA support capability meets a subscribed SLA requirement of an application, and sending the information about the first NSI to the AF entity through a communications interface. In a possible design, the chip system further includes a memory, where the memory is configured to store a program instruction and data that are necessary for the AF entity. The chip system may include a chip, or may include a chip and another discrete device.

For a technical effect brought by any one of the designs of the fourth aspect to the eighth aspect, refer to technical effects brought by the different designs of the first aspect. Details are not described herein again.

According to a ninth aspect, a terminal is provided. The terminal has a function of implementing the method according to the first aspect. The function may be implemented using hardware, or may be implemented using hardware executing corresponding software. The hardware or the software includes one or more modules corresponding to the functions. For example, the terminal may include: a receiving unit configured to receive a mode switching notification; and a switching unit configured to switch a working mode of an application to a target working mode based on the mode switching notification.

For an implementation of the terminal, refer to the behaviors and functions of the terminal in the method for ensuring a service level agreement of an application provided in the second aspect or the possible implementations of the second aspect. Details are not described herein again. Therefore, the provided terminal may achieve same beneficial effects as those in the first aspect.

According to a tenth aspect, a terminal is provided, including: a processor and a memory. The memory is configured to store a computer-executable instruction. When the terminal runs, the processor executes the computer-executable instruction stored in the memory, and the terminal is enabled to perform the method for ensuring a service level agreement of an application according to any one the implementations of the second aspect.

According to an eleventh aspect, a computer-readable storage medium is provided. The computer-readable storage medium stores an instruction, and when the instruction is run on a computer, the computer is enabled to perform the method for ensuring a service level agreement of an application according to any one of the implementations of the second aspect.

According to a twelfth aspect, a computer program product including an instruction is provided. When the computer program product runs on a computer, the computer is enabled to perform the method for ensuring a service level agreement of an application according to any one of the implementations of the second aspect.

According to a thirteenth aspect, a chip system is provided. The chip system includes a processor configured to support a terminal in implementing the functions in the foregoing aspects. For example, the terminal is supported to receive a mode switching notification through a communications interface, and switch a working mode of an application to a target working mode based on the mode switching notification. In a possible design, the chip system further includes a memory, where the memory is configured to store a program instruction and data that are necessary for the terminal. The chip system may include a chip, or may include a chip and another discrete device.

For a technical effect brought by any one of the designs of the ninth aspect to the thirteenth aspect, refer to technical effects brought by the different designs of the second aspect. Details are not described herein again.

According to a fourteenth aspect, a network side entity is provided. The network side entity has a function of implementing the method according to the third aspect. The function may be implemented using hardware, or may be implemented using hardware executing corresponding software. The hardware or the software includes one or more modules corresponding to the functions. For example, the network side entity includes: a receiving unit configured to receive a slice information request sent by an AF entity; and a sending unit configured to send a slice information response to the AF entity, where the slice information response includes SLA support capability information of at least one network slice instance between a specified location and a target network.

For an implementation of the network side entity, refer to the behaviors and functions of the network side entity in the method for ensuring a service level agreement of an application provided in the second aspect or the possible implementations of the second aspect. Details are not described herein again. Therefore, the provided network side entity may achieve same beneficial effects as those in the first aspect.

According to a fifteenth aspect, a network side entity is provided, including: a processor and a memory. The memory is configured to store a computer-executable instruction, and when the network side entity runs, the processor executes the computer-executable instruction stored in the memory, and the network side entity is enabled to perform the method for ensuring a service level agreement of an application according to any one the implementations of the third aspect.

According to a sixteenth aspect, a computer-readable storage medium is provided. The computer-readable storage medium stores an instruction, and when the instruction is run on a computer, the computer is enabled to perform the method for ensuring a service level agreement of an application according to any one of the implementations of the third aspect.

According to a seventeenth aspect, a computer program product including an instruction is provided. When the computer program product runs on a computer, the computer is enabled to perform the method for ensuring a service level agreement of an application according to any one of the implementations of the third aspect.

According to an eighteenth aspect, a chip system is provided. The chip system includes a processor and a communications interface that is configured to support a network side entity in implementing the functions in the foregoing aspects. For example, the network side entity is supported to receive, through the communications interface, a slice information request sent by an AF entity, and send a slice information response to the AF entity through the communications interface. In a possible design, the chip system further includes a memory, where the memory is configured to store a program instruction and data that are necessary for the network side entity. The chip system may include a chip, or may include a chip and another discrete device.

For a technical effect brought by any one of the designs of the fourteenth aspect to the eighteenth aspect, refer to technical effects brought by the different designs of the second aspect. Details are not described herein again.

According to a nineteenth aspect, a system for assurancing service level agreement of an application is provided, where the system includes the AF entity according to any one of the fourth aspect to the eighth aspect, the terminal according to any one of the ninth aspect to the thirteenth aspect, and the network side entity according to any one of the fourteenth aspect to the eighteenth aspect.

These aspects or other aspects in this application may be clearer and more intelligible in descriptions in the following embodiments.

DESCRIPTION OF EMBODIMENTS

Figure 1:
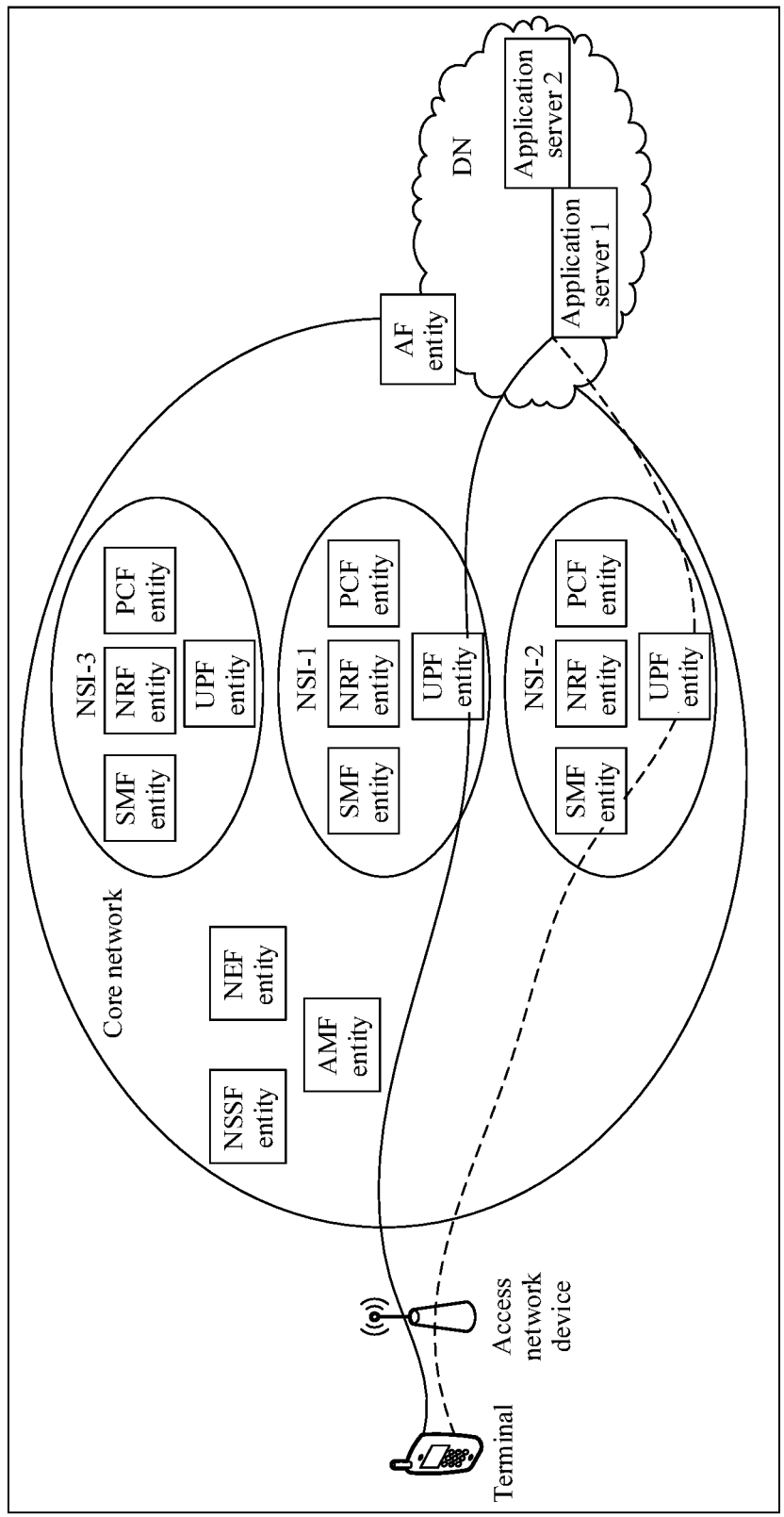
FIG. 1 is an architectural diagram of a system according to an embodiment of this application.

First of all, to facilitate understanding of the embodiments of this application, some technical terms in the embodiments of this application are described.

Network slice (NS): An NS is a logical network with a specific network feature, and is a key technology that meets a network differentiation requirement of a 5th generation (5G) mobile communications network proposed by the 3rd generation partnership project (3GPP). Different network slices are logically isolated from each other, and can flexibly provide one or more network services based on a requirement of a demand side. A network slice is identified by single network slice selection assistance information (S-NSSAI). The S-NSSAI includes a slice/service type (SST) and a slice differentiator (SD). The SST and the SD may be defined in a standard or defined by an operator. The SD is optional information that supplements the SST, to distinguish between a plurality of network slices with a same SST, for example, may be used to represent homing relationships of the network slices.

Network slice instance (NSI): An NSI is an instantiated network created by the operator on an infrastructure based on a network slice template, and is generated by combining different network function entities and physical resources. Different network slice instances are logically isolated from each other. One or more NSIs may be obtained through instantiation of one network slice, and each NSI is identified by a network slice instance identifier (NSI ID). In other words, one piece of S-NSSAI corresponds to one or more NSI IDs.

Service level agreement (SLA): An SLA is a contract between a service provider and a customer, is used to record an application service provided by the service provider, and defines performance criteria that the service provider has an obligation to meet. The SLA establishes the customer's expectations on the service provider in terms of performance and quality. The SLA may include a series of qualitative or quantitative rules such as availability, a performance indicator baseline, reliability, and a response time. SLA assurance is defined in the form of a series of service level objectives (SLO). The SLO is a combination of measurements of one or more limited service component.

SLA support capability information of the NSI: SLA support capability information of the NSI is a list of service levels and service indicators that can be met by the NSI and that are specified in an SLA signed by a user and the operator for a specified application service, and is used to represent a capability of the NSI of enabling the application service to achieve a series of SLOs included in the SLA. SLA support capability information of a same NSI may be the same or different in different deployment areas. For example, an NSI-1 is deployed in an area 1 and an area 2. A service type supported by the NSI-1 in the area 1 is an eMBB service, and a service type supported by the NSI-1 in the area 2 is an eMBB service that meets an AR low latency requirement. Alternatively, the NSI-1 supports, in both the area 1 and the area 2, an eMBB service that has no requirement on latency.

The SLA support capability information of the NSI describes one or more service level objectives for a specific application service that are ensured in achievement. The objectives may include but are not limited to: a service type supported by the network slice instance, a maximum quantity of terminals supported by the service type, a maximum allowed bandwidth that can be ensured by the service type, a maximum end-to-end network delay that can be ensured by the service type, a maximum terminal movement rate allowed by the service type, a reliability level of the service type, a service continuity mode supported by the service type, and the like.

The following describes implementations of the embodiments of this application in detail with reference to the accompanying drawings.

The technical solutions provided in this application may be applied to a network shown in FIG. 1, and the network may be a 5G network. As shown in FIG. 1, the network may include a terminal, an access network device, a core network, and a data network (DN). It should be noted that the network architecture shown in FIG. 1 is merely an example architectural diagram. Although not shown, the network shown in FIG. 1 may further include a unified data management (UDM) entity, a network data analytics function (NWDAF) entity, and the like in addition to the network function entities shown in FIG. 1. This is not limited.

The core network may include a session management function (SMF) entity, a network repository function (NRF) entity, a policy control function (PCF) entity, a user plane function (UPF) entity, a network slice selection function (NSSF) entity, a network exposure function (NEF) entity, an access and mobility management function (AMF) entity, and other network function entities. In addition, the network further includes an application function (AF) entity. The AF entity may be a third-party application control platform or a device of an operator. The AF entity may provide a service for a plurality of application servers. For example, in this application, the AF entity may receive a request message from the application server, and provide SLA assurance for a related application (namely, a service provided by the application server) of the terminal.

The DN may include various application servers that provide services. It should be noted that the AF entity may be deployed in the application server, or may be independently deployed in the network. The following describes in detail the technical solutions provided in the embodiments of this application using merely an example in which the AF entity is deployed in the network independent of the application server. It may be understood that when the AF entity is deployed in the application server, the AF entity in the application server may perform functions performed by the AF entity in the following embodiments.

The network may be divided by the operator into a plurality of logically isolated network slice instances, and each network slice instance is generated by combining different network function entities and physical resources. In a possible structure, network function entities such as the SMF entity, the NRF entity, the PCF entity, and the UPF entity may form a network slice instance (NSI). Network slice instances are isolated from each other, and a plurality of network slice instances may share a same NSSF entity, NEF entity, AMF entity, UDM entity, NWDAF entity, or the like.

The terminal in FIG. 1 may be a user equipment (UE), or may be any handheld device, vehicle-mounted device, wearable device, or computing device that has a wireless communication function, or another processing device connected to a wireless modem. The terminal may alternatively be but is not limited to: a subscriber unit, a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal, a mobile station (MS), or the like. The terminal may maintain a correspondence between an identifier of an application and S-NSSAI, and access the application server in the DN through a PDU session established in an NSI corresponding to the S-NSSAI, to obtain an application service provided by the application server. There may be one or more NSIs providing access for the terminal at a random location.

The access network device in FIG. 1 is mainly configured to implement functions such as a radio physical layer function, resource scheduling and radio resource management, radio access control, and mobility management. The access network device may be a next generation NodeB (gNB) or any other access unit.

The NSSF entity in FIG. 1 is mainly configured to select an appropriate NSI for the terminal based on S-NSSAI requested by the terminal and subscribed S-NSSAI of the application. A mapping relationship between the S-NSSAI and the NSI may be configured in the NSSF entity. The AMF entity mainly implements an access control and mobility management function for the terminal. The NEF entity is mainly configured to expose functions of other function entities in the core network to another device. The SMF entity in the NSI is mainly configured to implement session management functions such as establishment, release, and modification of a user plane transmission path. The UPF entity is mainly responsible for functions such as routing and forwarding of user plane data, for example, responsible for filtering, data transmission/forwarding, rate control, and charging information generation of a data packet of the terminal.

The AF entity in FIG. 1 mainly serves as an intermediate function entity for interaction between the application server and the function entity in the core network. The application server may implement dynamic control on network quality of service and charging, ensure an SLA requirement, obtain running information of a function entity (for example, the NSI) in the core network, and the like via the AF entity. In this embodiment of this application, the AF entity may be a function entity deployed by the operator, or may be a function entity deployed by a service provider. The service provider may be a third-party service provider, or may be a service provider that belongs to the operator. This is not limited. When the AF entity is a function entity deployed by the operator, the AF entity may directly interact with the function entity in the core network. When the AF entity is a function entity deployed by the third-party service provider, the AF entity may interact with the function entity in the core network via the NEF entity in FIG. 1. A manner of interaction between the AF entity and another function entity is not limited in this embodiment of this application.

In the network shown in FIG. 1, the service provider may subscribe to a network slice from the operator for an application service provided by the application server, and provide a service for a user on the subscribed network slice. Alternatively, the service provider may not subscribe to a network slice, but use a public network slice provided by the operator to provide a service for the user. When the service provider subscribes to a network slice from the operator for an application service provided by the application server, an association relationship between an application and the subscribed network slice (for example, subscribed S-NSSAI) may be configured on the AF entity.

When sending the slice selection request to the NSSF entity for an application, the terminal determines S-NSSAI corresponding to the application, and sends the slice selection request carrying the S-NSSAI to the NSSF entity. The NSSF entity determines an appropriate NSI (for example, the NSI-1 in FIG. 1) based on association relationships between the S-NSSAI and the NSIs. The SMF entity in the NSI-1 selects an appropriate UPF entity from the NSI-1, and establishes a PDU session from the terminal to the DN via the UPF entity. The terminal accesses the application server in the DN via the PDU session established in the NSI-1, and obtains an application service provided by the application server.

In a process in which the terminal obtains the application service provided by the application server, the terminal may subscribe to an SLA-related service from the application server. After the subscription succeeds, the application server may deliver an application and a subscribed SLA to the AF entity, to request the AF entity to ensure a service level of the application. In other words, a function of ensuring the service level of the application is to be implemented by the AF entity. After receiving an SLA assurance request sent by the application server, the AF entity obtains SLA support capability information of NSIs from a location to a target network, and takes a corresponding measure (for example, switching a current session of the application to a new PDU session or switching working mode of the application) based on the obtained SLA support capability information of the NSIs, to ensure the service level of the application. For the implementation, refer to solutions shown in FIG. 3 to FIG. 8B. Details are not described herein.

Alternatively, the application server obtains SLA support capability information of NSIs from a location to a target network via the AF entity, and takes a corresponding measure (for example, switching a current session or working mode of the application to a new PDU session or working mode) based on the obtained SLA support capability information of the NSIs, to ensure the service level of the application. For the implementation, refer to the solution shown in FIG. 9. Details are not described herein.

Figure 2:
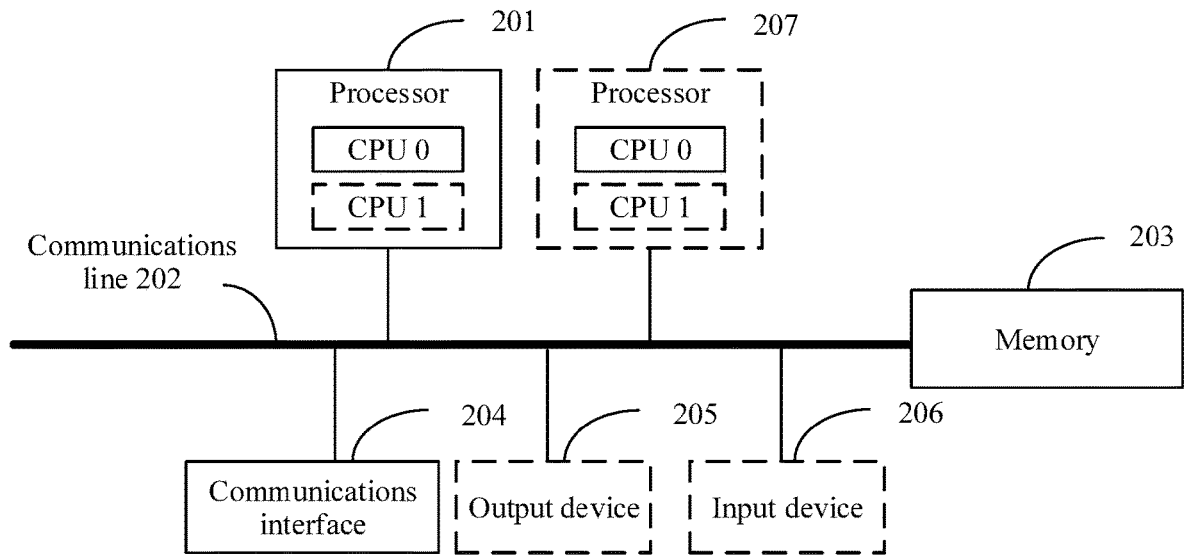
FIG. 2 is a schematic structural diagram of a communications device according to an embodiment of this application.

To implement the technical solutions provided in the embodiments of this application, the network function entities such as the AF entity, the terminal, the NSSF entity, and the NWDAF entity in FIG. 1 may be implemented in a form of a communications device in FIG. 2. As shown in FIG. 2, the communications device 200 includes at least one processor 201, a communications line 202, a memory 203, and at least one communications interface 204.

The processor 201 may be a central processing unit (CPU), or an application-specific integrated circuit (ASIC), or may be configured as one or more integrated circuits implementing the embodiments of this application, for example, one or more microprocessors (DSP) or one or more field programmable gate arrays (FPGA).

The communications line 202 may include a path, to transfer information between the foregoing components.

The communications interface 204, which uses any apparatus such as a transceiver, is configured to communicate with another device or communications network, for example, the Ethernet, a radio access network (RAN), or a wireless local area network (WLAN).

The memory 203 may be a read-only memory (ROM) or another type of static storage device that can store static information and an instruction; or a random-access memory (RAM) or another type of dynamic storage device that can store information and an instruction. The memory 23 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that is accessible by a computer, but is not limited thereto. The memory may exist independently, and is connected to the processor through the communications line 202. Alternatively, the memory 203 may be integrated with the processor 201.

The memory 203 is configured to store a computer-executable instruction for executing the solutions of this application, and the processor 201 controls the execution. The processor 201 is configured to execute the computer-executable instruction stored in the memory 203, to implement a method for ensuring a service level agreement of an application provided in the following embodiments of this application. Optionally, the computer-executable instruction in the embodiments of this application may also be referred to as application program code. This is not specifically limited in the embodiments of this application.

During implementation, in an embodiment, the processor 201 may include one or more CPUs, for example, a CPU 0 and a CPU 1 in FIG. 2.

During implementation, in an embodiment, the communications device 200 may include a plurality of processors, for example, the processor 201 and a processor 207 in FIG. 2. The processors each may be a single-core processor, or may be a multi-CPU processor. The processor herein may be one or more devices, circuits, and/or processing cores for processing data (for example, a computer program instruction).

During implementation, in an embodiment, the communications device 200 may further include an output device 205 and an input device 206. The output device 205 communicates with the processor 201, and may display information in a plurality of manners. For example, the output device 205 may be a liquid crystal display (LCD), a light emitting diode (LED) display device, a cathode ray tube (CRT) display device, a projector, or the like. The input device 206 communicates with the processor 201, and may receive an input from a user in a plurality of manners. For example, the input device 206 may be a mouse, a keyboard, a touchscreen device, a sensing device, or the like.

It should be noted that the communications device 200 may be a general-purpose device or a dedicated device. During implementation, the communications device 200 may be a desktop computer, a portable computer, a network server, a PDA, a mobile phone, a tablet computer, a wireless terminal, an embedded device, or a device having a structure similar to that in FIG. 2. A type of the communications device 200 is not limited in this embodiment of this application.

The following describes in detail the technical solutions provided in the embodiments of this application with reference to FIG. 1.

Figure 3:
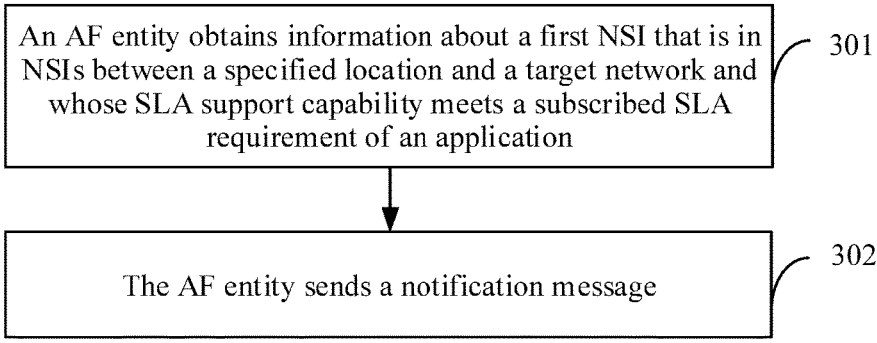
FIG. 3 is a flowchart of a method for ensuring a service level agreement of an application according to an embodiment of this application.

FIG. 3 is a flowchart of a method for ensuring a service level agreement of an application according to an embodiment of this application. According to the method, an AF entity ensures a service level of an application. As shown in FIG. 3, the method may include step 301 and step 302.

Step 301: The AF entity obtains information about a first NSI that is in NSIs between a specified location and a target network and whose SLA support capability meets a subscribed SLA requirement of the application.

The AF entity may be any AF entity in FIG. 1.

The specified location may be a current location of a terminal using the application, or may be a location of the terminal at a next moment, for example, may be any possible location on a travel route of the terminal after a current moment. The terminal may establish a PDU session in the first NSI. An APP client corresponding to an application server may be installed on the terminal. The application server may connect to the APP client on the terminal via the PDU session provided by the NSI, and provide, through the APP client, an application service for a user using the terminal. The user may sign an SLA for the application with the application server.

The target network may be a DN in which the application server that provides an application service for the terminal is located.

That the AF entity obtains information about a first NSI that is in NSIs between a specified location and a target network and whose SLA support capability meets a subscribed SLA requirement of the application may include: sending, by the AF entity, a slice information request to a network side entity, where the slice information request is used to request to obtain SLA support capability information of the NSIs between the specified location and the target network; receiving, by the network side entity, the slice information request sent by the AF entity; obtaining, based on location information of the specified location, an identifier of the target network, subscribed S-NSSAI of the application, and correspondences between the S-NSSAI and the NSIs, SLA support capability information of at least one NSI between the specified location and the target network; sending a slice information response to the AF entity, where the slice information response includes the SLA support capability information of the at least one NSI between the specified location and the target network; receiving, by the AF entity, the slice information response sent by the network side entity; and obtaining, from the SLA support capability information of the at least one NSI based on the subscribed SLA of the application and the SLA support capability information of the at least one NSI, the information about the first NSI that meets the subscribed SLA requirement of the application.

The slice information request may include information about a user using the application, the location information of the specified location, and the identifier of the target network. The subscribed S-NSSAI of the application may be obtained by the network side entity from a UDM entity. For example, the network side entity sends a request to the UDM entity to request to obtain subscription information of the user, and the UDM entity sends the subscribed S-NSSAI of the application to the network side entity. Alternatively, the slice information request may include information about a user using the application, the location information of the specified location, the identifier of the target network, and the subscribed S-NSSAI of the application. For example, after an application service provider subscribes to a network slice from an operator, the operator sends, to the AF entity through an operations support system (OSS), information that carries an identifier of an application and subscribed S-NSSAI of the application. After receiving the information, the AF entity correspondingly configures the identifier of the application and the subscribed S-NSSAI of the application in the AF entity, and sends the slice information request carrying the identifier of the application and the subscribed S-NSSAI of the application to the network side entity when performing step 301.

The correspondences between the S-NSSAI and the NSIs may be configured by the operator in an NSSF entity through the OSS after the application service provider subscribes to the network slice from the operator and the operator deploys an NSI based on a subscription request. Another network entity (for example, an NWDAF entity) may obtain the correspondences between the S-NSSAI and the NSIs from the NSSF entity.

The information about the user is used to identify the terminal using the application. The information about the user may be but is not limited to: a subscription permanent identifier SUPI, a permanent equipment identifier PEI, a sequence number of the terminal, an Internet Protocol (IP) address of the terminal, or the like.

The location information of the specified location is used to identify the specified location, may be a location tracking area identity corresponding to the specified location, a cell identifier corresponding to the specified location, or the like, and may further include longitude information and latitude information of the specified location. The AF entity may obtain location information of the current location of the terminal from the AMF entity. For an obtaining manner, refer to FIG. 4A and FIG. 4B. Details are not described herein. The AF entity may obtain location information of the location of the terminal at a next moment from the application server. For example, the AF entity may send a location request to the application server. After receiving the location request sent by the AF entity, the application server returns a location response to the AF entity, where the location response includes information about the travel route of the terminal. The AF entity may determine the location of the terminal at the next moment based on the information about the travel route. For example, the travel route of the terminal 1 is A-B-C-D. If the current location of the terminal is A, it may be learned, based on the travel route, that the location of the terminal at a next moment is B, C, or D.

The identifier of the target network may be used to identify the DN in which the application server is located, and may be but is not limited to a number or an IP address of the DN in the network.

The subscribed SLA of the application may be actively delivered by the application server to the AF entity. Alternatively, the AF entity sends an obtaining request to the application server, to request the subscribed SLA of the application. Alternatively, after the application service provider subscribes to the network slice from the operator, the operator configures the subscribed SLA of the application in the AF entity through the operations support system. This is not limited.

The information about the first NSI may be an ID of the first NSI, S-NSSAI corresponding to the first NSI, or SLA support capability information of the first NSI. For example, the information about the first NSI may depend on a subsequent execution process of the AF entity. Details are not described herein.

The network side entity may be the NSSF entity or the NWDAF entity in the network shown in FIG. 1. The NSSF entity or the NWDAF entity may obtain SLA support capability information of each NSI in the network in advance. For an obtaining manner, refer to descriptions in FIG. 4A and FIG. 4B. Details are not described herein.

It should be noted that the at least one NSI obtained by the network side entity is included in NSIs corresponding to the subscribed S-NSSAI of the application. In other words, the at least one NSI is an NSI that can be accessed by the user using the application. The obtaining, by the network side entity based on location information of the specified location, an identifier of the target network, and subscribed S-NSSAI of the application, SLA support capability information of at least one NSI between the specified location and the target network may include: first obtaining, by the network side entity from NSIs in the network based on the location information of the specified location and the identifier of the target network, a plurality of NSIs between the specified location and the target network; then determining, from the plurality of NSIs based on the subscribed S-NSSAI of the application and the correspondences between the S-NSSAI and the NSIs, the at least one NSI included in the NSIs corresponding to the subscribed S-NSSAI of the application; and obtaining the SLA support capability information of the at least one NSI.

For example, the NSSF entity obtains SLA support capability information of an NSI-1, an NSI-2, and an NSI-3 in advance, and the NSI-1, the NSI-2, and the NSI-3 each cover an area between a location A and a DN 1. The subscribed S-NSSAI of the application is S-NSSAI 1 and S-NSSAI 2, where the S-NSSAI 1 corresponds to the NSI-1, and the S-NSSAI 2 corresponds to the NSI-2. In this case, the AF entity sends a slice information request to the NSSF entity to request support capability information of NSIs between the location A and the DN 1. After receiving the request, the NSSF entity determines the NSIs, namely, the NSI-1, the NSI-2, and the NSI-3 between the location A and the DN 1, checks the subscribed S-NSSAI of the application and the correspondences between the S-NSSAI and the NSIs, and determines that NSIs corresponding to the subscribed S-NSSAI of the application are the NSI-1 and the NSI-2. The NSSF entity further obtains the NSI-1 and the NSI-2 from the NSI-1, the NSI-2, and the NSI-3, and returns the NSI-1 and the NSI-2 to the AF entity as the SLA support capability information between the location A and the DN 1.

Step 302: The AF entity sends a notification message.

The notification message may include the information about the first NSI.

In a possible implementation, the notification message is used to trigger establishment of a new PDU session, and the information about the first NSI includes the S-NSSAI corresponding to the first NSI. The notification message further includes an identifier of the application and the information about the user. Alternatively, the notification message may include an identifier of the application, the information about the user, and a service continuity mode indication.

That the AF entity sends a notification message includes sending, by the AF entity, the notification message to the AMF entity.

After receiving the notification message, the AMF entity sends a session establishment indication to the terminal based on the information about the user, to indicate the terminal to establish a new PDU session. The session establishment indication includes the S-NSSAI corresponding to the first NSI and the identifier of an application. Alternatively, the session establishment indication includes the S-NSSAI corresponding to the first NSI, the identifier of the application, and the service continuity mode indication. The terminal receives the session establishment indication, and sends, to the AMF entity, a session establishment request that carries the S-NSSAI of the first NSI. The AMF entity selects, based on a slice selection result from the NSSF entity, an SMF entity in the first NSI to establish a new PDU session. A process of establishing a PDU session belongs to other approaches, and details are not described in the embodiments of this application.

The service continuity mode (SSC mode) indication may be used to indicate whether the terminal is to initiate a new PDU session immediately when terminating a current PDU session, or establish a new PDU session while maintaining an original PDU session.

It should be noted that in this implementation, the S-NSSAI corresponding to the first NSI included in the notification message may be replaced by a network slice selection policy (NSSP) of a current application. The NSSP specifies that S-NSSAI used by the application is the S-NSSAI corresponding to the first NSI. The terminal may determine, through the NSSP, the S-NSSAI to be used when a new PDU session is established for the current application.

In addition, in this implementation, the notification message includes the S-NSSAI corresponding to the first NSI, and may further carry the ID of the first NSI. After the AF entity sends the notification message to the AMF entity, the AMF entity may store a correspondence between the ID of the first NSI and the S-NSSAI corresponding to the first NSI, and send, to the terminal based on the information about the user, a session establishment indication that carries the S-NSSAI corresponding to the first NSI. After receiving the session establishment indication, the terminal updates the S-NSSAI that is used by the application and that is configured locally to the S-NSSAI corresponding to the first NSI, and sends, to the AMF entity, the session establishment request that carries the S-NSSAI corresponding to the first NSI. After receiving the request, the AMF entity selects, based on the correspondence that is between the ID of the first NSI and the S-NSSAI corresponding to the first NSI and that is stored in the AMF entity, an SMF entity in the first NSI to establish a new PDU session. In this case, the NSSF entity does not need to notify the AMF entity of the slice selection result.

Figure 4A:
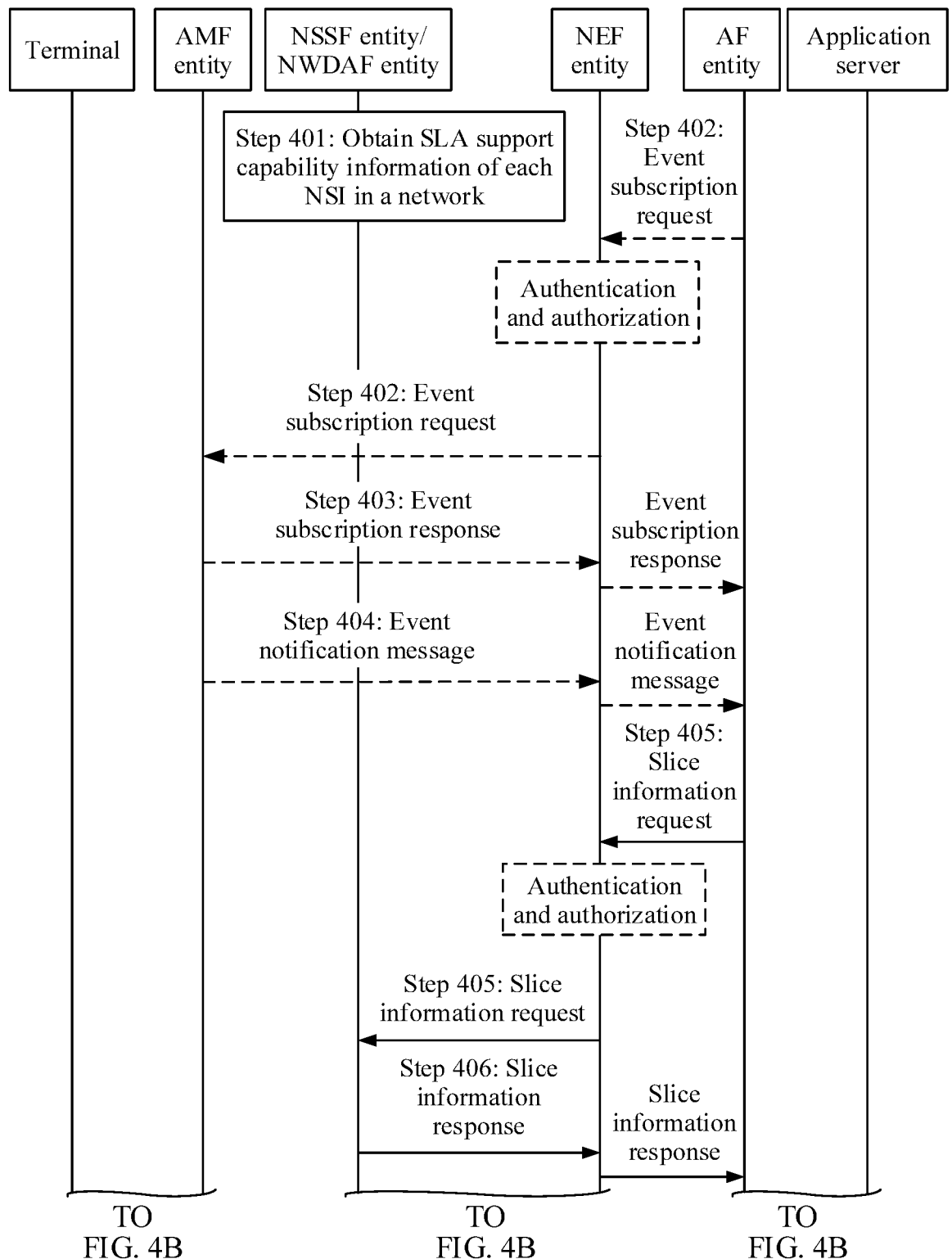
FIG. 4A and FIG. 4B are flowcharts of another method for ensuring a service level agreement of an application according to an embodiment of this application.
Figure 4B:
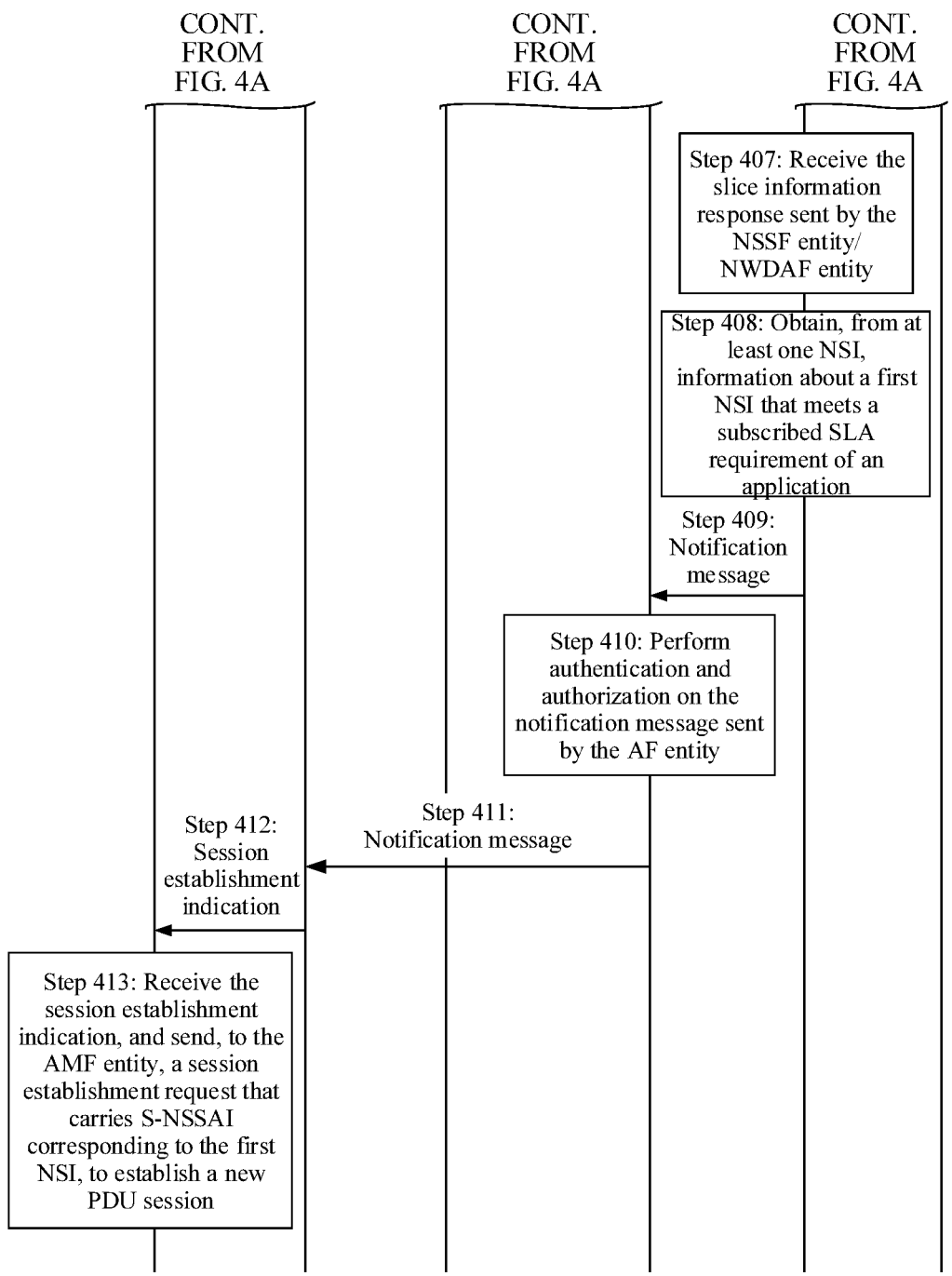

For the implementation, refer to FIG. 4A and FIG. 4B. Details are not described herein.

In another possible implementation, the notification message is used to notify to update, using the S-NSSAI corresponding to the first NSI, the S-NSSAI corresponding to the application on the terminal. The information about the first NSI is the S-NSSAI corresponding to the first NSI. The notification message further includes the information about the user and the identifier of the application.

That the AF entity sends a notification message includes sending, by the AF entity, the notification message to the AMF entity.

After receiving the notification message, the AMF entity sends, to the terminal based on the information about the user, configuration update indication including the identifier of the application and the S-NSSAI corresponding to the first NSI. The terminal receives the configuration update indication, updates, based on the identifier of the application and the S-NSSAI corresponding to the first NSI, the S-NS-SAI that corresponds to the application and that is configured locally to the S-NSSAI corresponding to the first NSI, and sends a configuration update response to the AF entity via the AMF entity. The AF entity receives the configuration update response, and sends a session establishment indication to the terminal via the AMF entity or the application server. The terminal receives the session establishment indication, and sends, to the AMF entity, a session establishment request that carries the updated S-NSSAI (namely, the S-NSSAI corresponding to the first NSI) corresponding to the application. The AMF entity selects, based on a slice selection result from the NSSF entity, an SMF entity in the first NSI to establish a new PDU session. The session establishment indication is used to indicate the terminal to establish a new PDU session, and the session establishment indication includes the identifier of the application.

Figure 5A:
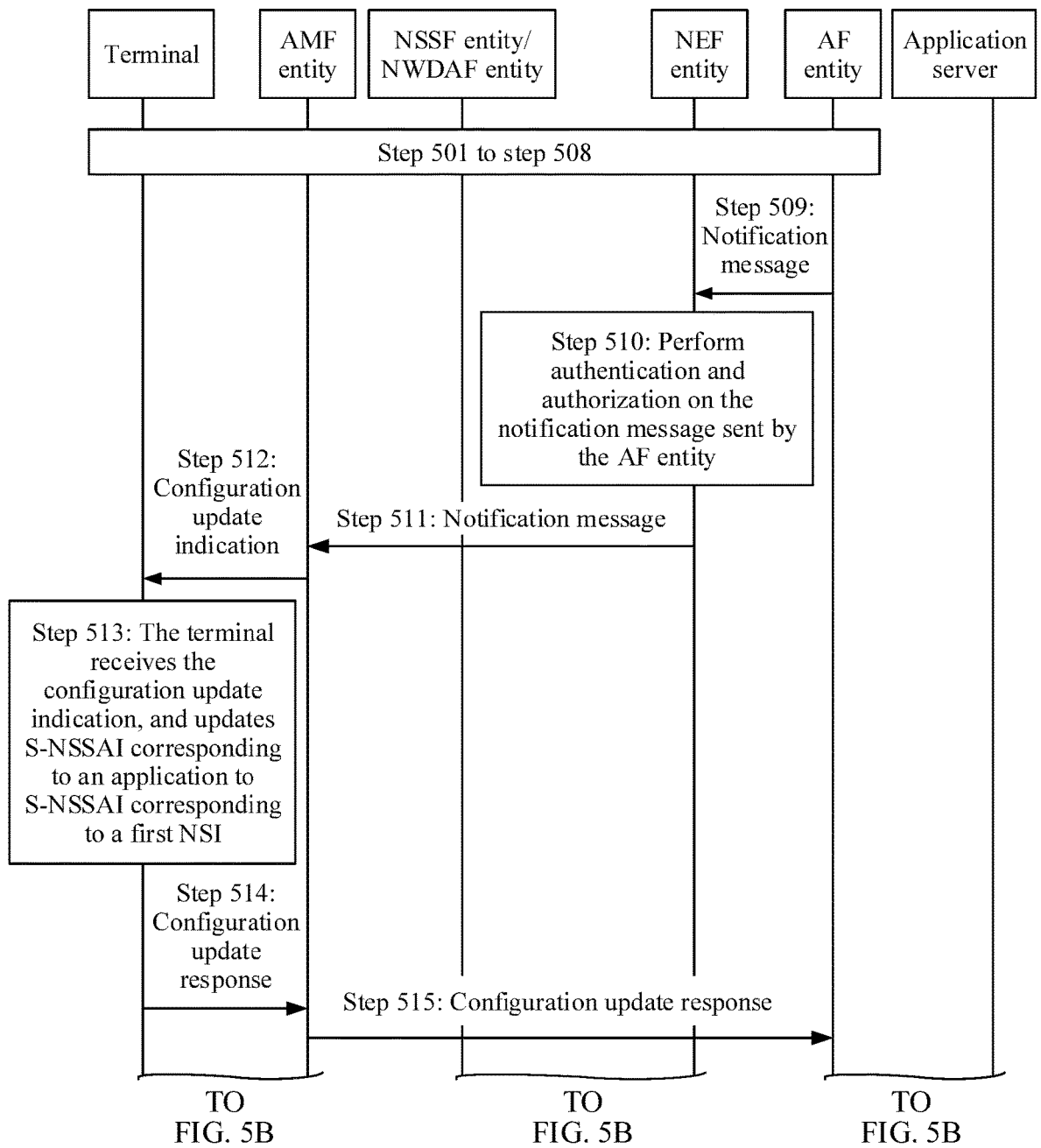
FIG. 5A and FIG. 5B are flowcharts of still another method for ensuring a service level agreement of an application according to an embodiment of this application.
Figure 5B:
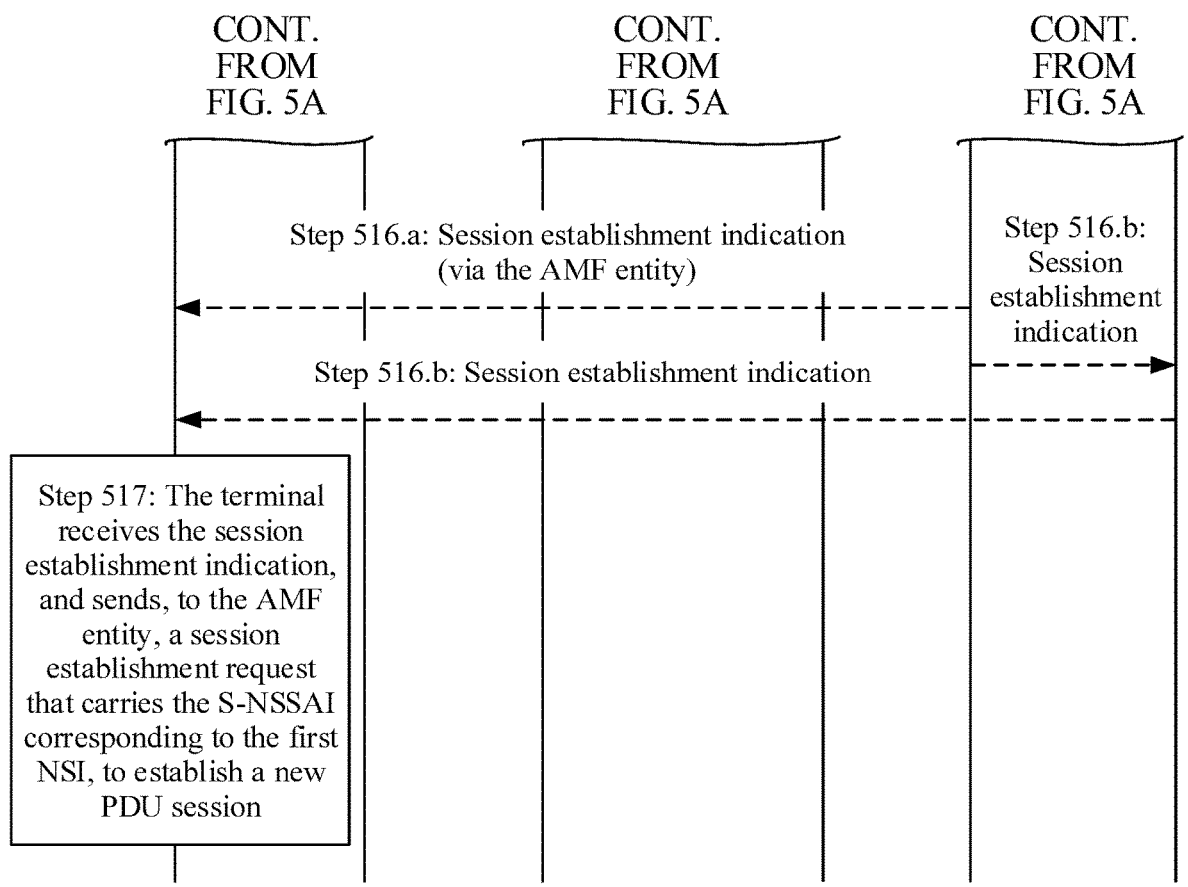

For the implementation, refer to FIG. 5A and FIG. 5B. Details are not described herein.

In still another possible implementation, the notification message is used to notify to update, using the S-NSSAI corresponding to the first NSI, the S-NSSAI corresponding to the application on the terminal, and trigger establishment of a new PDU session. The information about the first NSI is the S-NSSAI corresponding to the first NSI. The notification message further includes the information about the user and the identifier of the application.

That the AF entity sends a notification message includes sending, by the AF entity, the notification message to the AMF entity.

After receiving the notification message, the AMF entity sends a configuration update indication and a session establishment indication to the terminal based on the information about the user. The terminal receives the configuration update indication, updates, based on the identifier of the application and the S-NSSAI corresponding to the first NSI, the S-NSSAI that corresponds to the application and that is configured locally to the S-NSSAI corresponding to the first NSI, and sends, to the AMF entity based on the session establishment indication, a session establishment request that carries the S-NSSAI corresponding to the first NSI. The AMF entity selects, based on the slice selection result from the NSSF entity, an SMF entity in the first NSI to establish a new PDU session.

Figure 6:
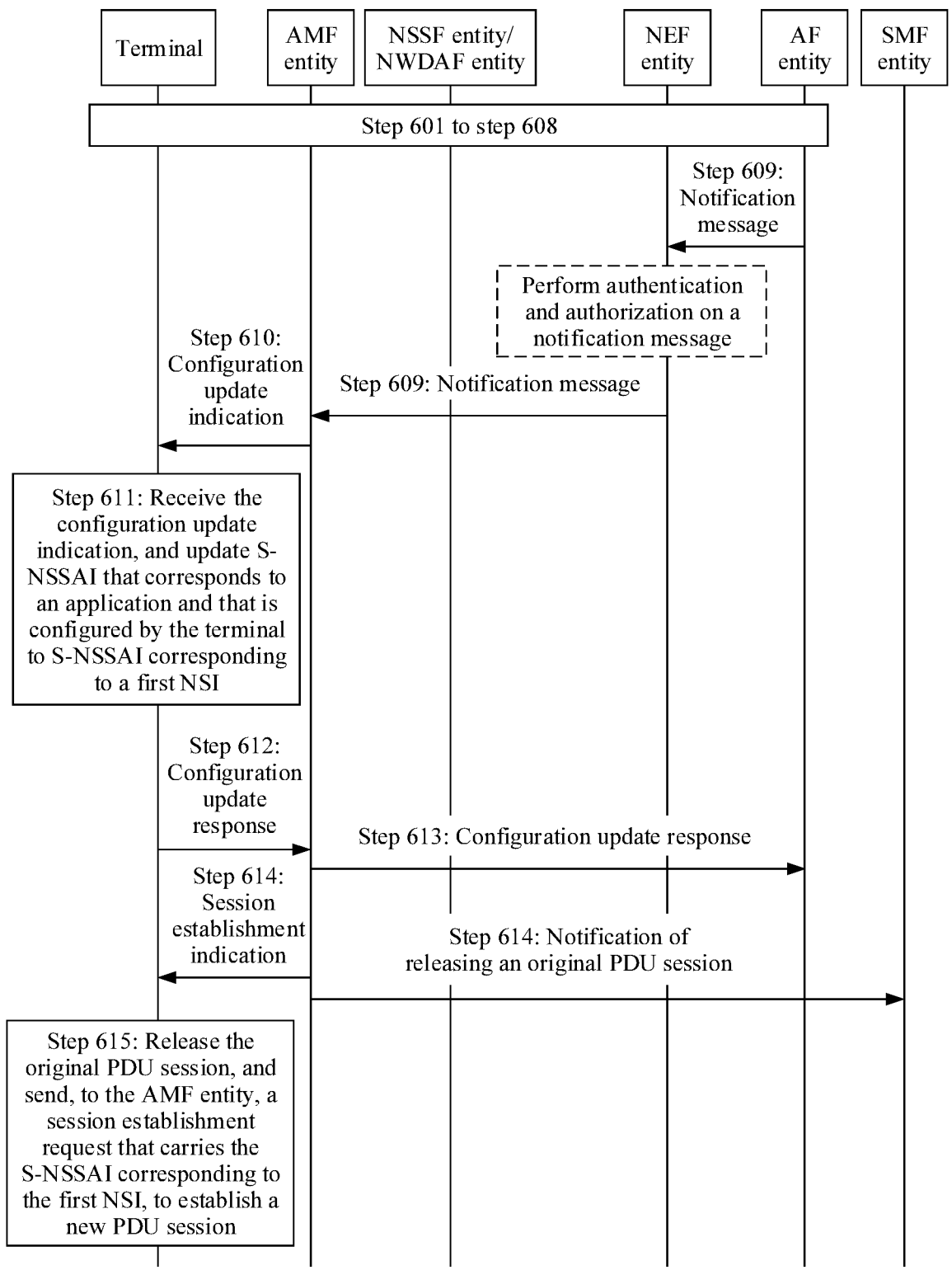
FIG. 6 is a flowchart of yet another method for ensuring a service level agreement of an application according to an embodiment of this application.

For the implementation, refer to FIG. 6. Details are not described herein.

In yet another possible implementation, the notification message is used to notify to update the NSSP of the terminal. The information about the first NSI is the S-NSSAI corresponding to the first NSI. The notification message further includes the information about the user and the identifier of the application.

That the AF entity sends a notification message includes sending, by the AF entity, the notification message to the UDM entity.

After receiving the notification message, the UDM entity updates the NSSP of the terminal based on the identifier of the application and the S-NSSAI corresponding to the first NSI, and sends an NSSP update indication to the terminal via the AMF entity. The NSSP update indication is used to indicate the terminal to update the NSSP configured in the terminal, and the NSSP update indication includes an updated NSSP. The terminal receives the NSSP update indication, and updates the NSSP configured in the terminal. The UDM entity sends an NSSP update response to the AF entity. The AF entity receives the NSSP update response, and sends a session establishment indication to the terminal via the AMF entity or the application server. The terminal receives the session establishment indication, and sends, to the AMF entity, a session establishment request that carries the S-NSSAI corresponding to the first NSI. The AMF entity selects, based on the slice selection result from the NSSF entity, an SMF entity in the first NSI to establish a new PDU session. The session establishment indication is used to indicate the terminal to establish a new PDU session, and the session establishment indication includes the identifier of the application.

Figure 7:
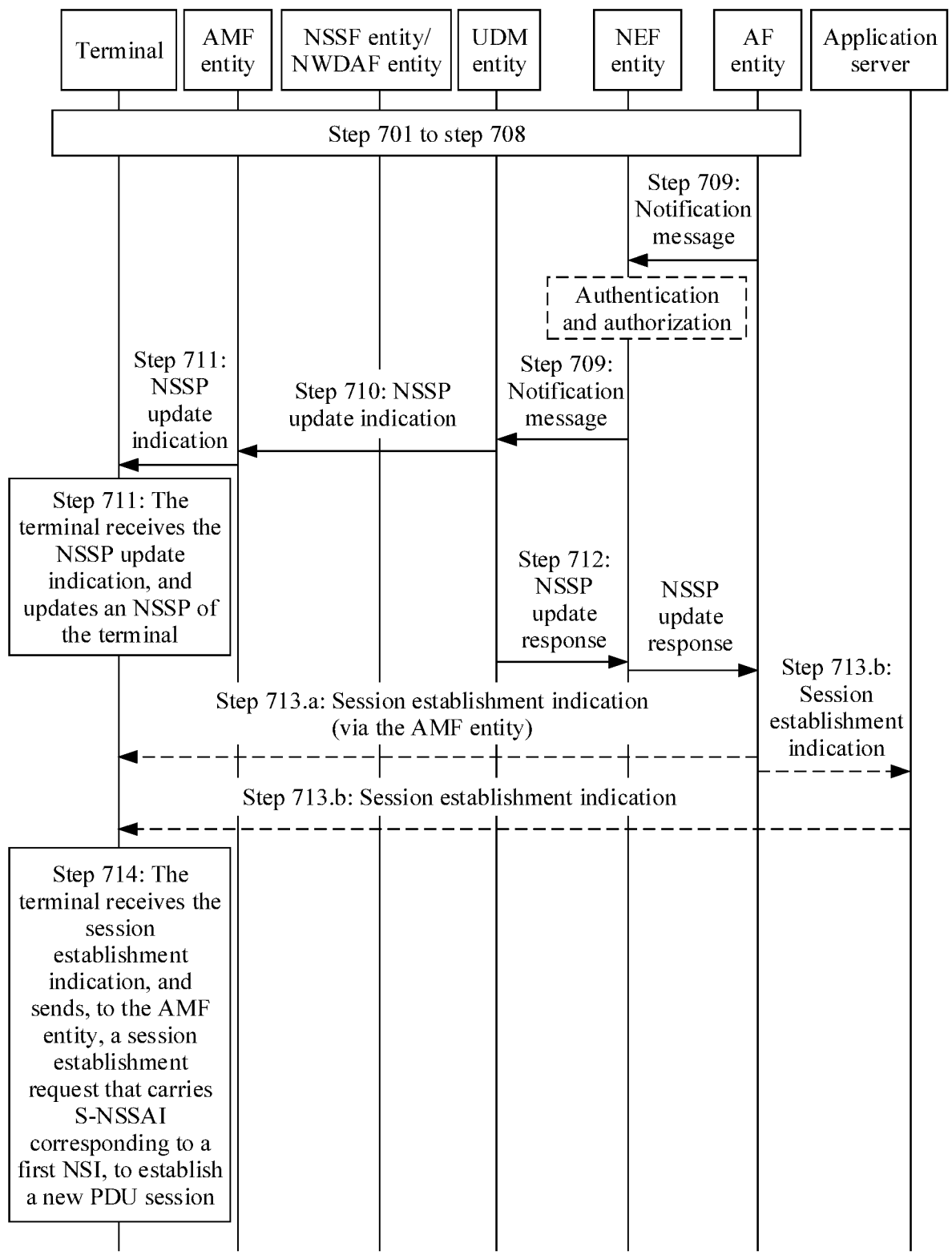
FIG. 7 is a flowchart of still yet another method for ensuring a service level agreement of an application according to an embodiment of this application.

For the implementation, refer to FIG. 7. Details are not described herein.

In still yet another possible implementation, the notification message is used to notify the NSSF entity to specify an NSI for the terminal. The information about the first NSI is the ID of the first NSI. The notification message further includes the information about the user and S-NSSAI currently used by the application.

That the AF entity sends a notification message includes sending, by the AF entity, the notification message to the NSSF entity.

After receiving the notification message, the NSSF entity generates a slice selection control request record based on the information about the user and the S-NSSAI currently used by the application, associates the information about the user, the S-NSSAI currently used by the application, and the ID of the first NSI, and then sends a slice selection control response to the AF entity. After receiving the slice selection control response, the AF entity sends a session establishment indication to the terminal via the AMF entity or the application server. The terminal receives the session establishment indication, sends, to the AMF entity, a session establishment request that carries the S-NSSAI currently used by the application and the information about the user, and sends, to the NSSF entity, a slice selection request that carries the S-NSSAI currently used by the application and the information about the user. The NSSF entity selects the first NSI based on the previously generated record, and sends a slice selection result to the AMF entity. The AMF entity selects, based on the slice selection result from the NSSF entity, an SMF entity in the first NSI to establish a new PDU session.

Figure 8A:
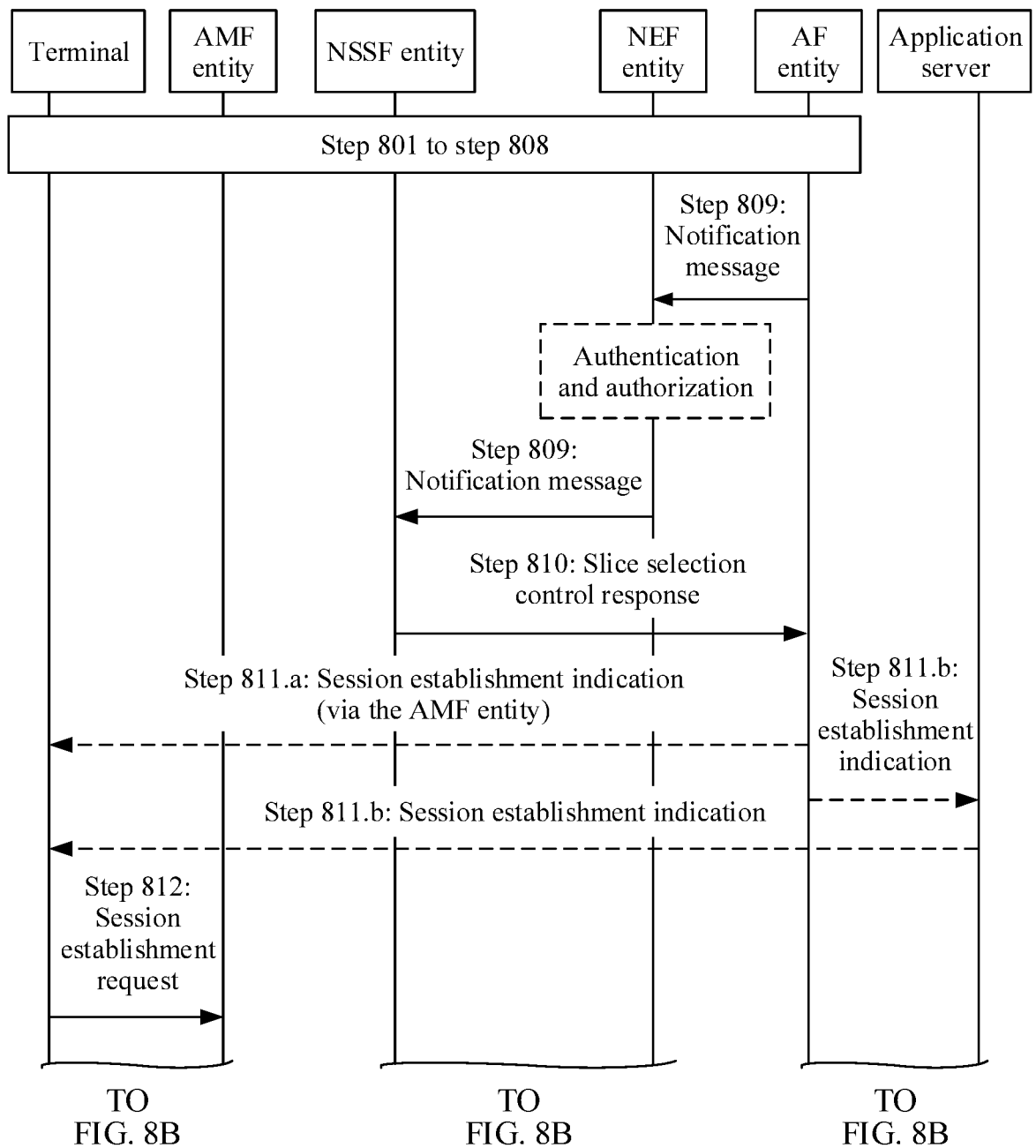
FIG. 8A and FIG. 8B are flowcharts of a further another method for ensuring a service level agreement of an application according to an embodiment of this application.
Figure 8B:
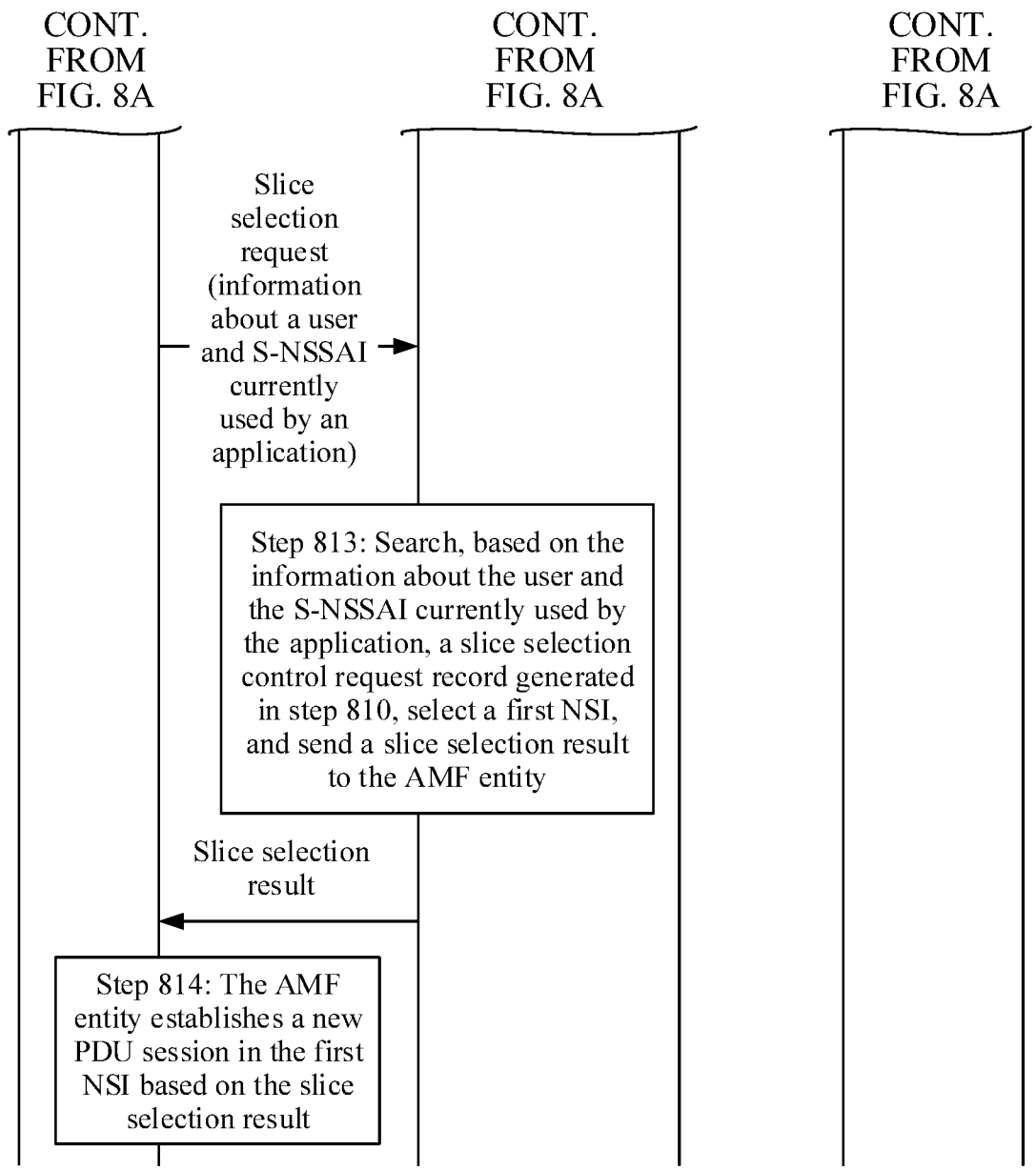

For the implementation, refer to FIG. 8A and FIG. 8B. Details are not described herein.

It should be noted that, in the foregoing possible implementations, when the AF entity is a function entity deployed by the operator, the AF entity may directly interact with the AMF entity, the NSSF entity, and the UDM entity. When the AF entity is a function entity deployed by a third-party application service provider, the AF entity may interact with the AMF entity, the NSSF entity, and the UDM entity via the NEF entity. The NEF entity may perform authentication and authorization on the notification message sent by the AF entity, to ensure validity and security of the AF entity. For the implementation process, refer to FIG. 4A to FIG. 8B. Details are not described herein.

It can be learned from the foregoing that in the solution shown in FIG. 3, the AF entity may obtain the information about the NSI whose SLA support capability meets the subscribed SLA requirement of the application between the specified location and the target network, and send the information about the NSI to another network function entity, to establish a PDU session in the NSI for the terminal. The terminal accesses the application server via the PDU session, and obtains an application service provided by the application server. The SLA support capability information of the NSI obtained by the AF entity meets the subscribed SLA requirement of the application, and therefore, after the terminal accesses the application server via the PDU session established in the NSI, the service level of the application can be well ensured.

Optionally, before the solution shown in FIG. 3 is performed, the application server sends an SLA assurance request to the AF entity, to request the AF entity to ensure a service level of an application. In other words, the AF entity is authorized to ensure a service level of an application provided by the application server. The SLA assurance request includes the identifier of the application and the subscribed SLA of the application.

Optionally, the AF entity enables, only after receiving the SLA assurance request, a function of the AF entity of ensuring a service level of an application, that is, enables a function of ensuring a service level of an application provided in this embodiment of this application, to reduce power consumption of the AF entity.

The SLA assurance request may further includes information about a specific user or user group, where the information about the specific user or user group is used to indicate the AF entity to ensure a service level of an application of a related user. Additionally, the related user is determined based on the information about the specific user or user group.

Optionally, before performing step 301, the AF entity first determines whether SLA support capability information of an NSI currently accessed by the terminal meets the subscribed SLA requirement of the application between the specified location and the target network. If it is determined that the SLA support capability information of the NSI currently accessed by the terminal meets the subscribed SLA requirement of the application between the specified location and the target network, no processing is performed. If the SLA support capability information of the NSI currently accessed by the terminal does not meet the subscribed SLA requirement of the application between the specified location and the target network, the AF entity is triggered to perform step 301. Therefore, step 301 does not necessarily need to be performed after the AF entity enables the function of ensuring the service level of the application. This reduces power consumption caused by interaction between the AF entity and another network side device in a case in which the SLA support capability information of the NSI currently accessed by the terminal meets the subscribed SLA requirement of the application.

In this embodiment of this application, the AF entity may automatically detect the SLA support capability of the NSI currently accessed by the terminal. When detecting that the SLA support capability information of the NSI currently accessed by the terminal does not meet the subscribed SLA requirement of the application between the specified location and the target network, step 301 is performed.

Alternatively, the AF entity detects a location of the terminal. When detecting that the location of the terminal moves, the AF entity determines the SLA support capability information of the NSI currently accessed by the terminal may not meet the subscribed SLA requirement of the application between the specified location and the target network, and performs step 301.

Alternatively, the application server detects the SLA support capability of the NSI currently accessed by the terminal. When detecting that the SLA support capability information of the NSI currently accessed by the terminal does not meet the subscribed SLA requirement of the application between the specified location and the target network, the application server sends a capability notification message to the AF entity. The AF entity receives the capability notification message sent by the application server, and performs step 301. The capability notification message is used to notify the AF entity that the SLA support capability of the NSI currently accessed by the terminal does not meet the subscribed SLA requirement of the application between the specified location and the target network.

Further, in the solution shown in FIG. 3, if there is no NSI whose SLA support capability information meets the subscribed SLA requirement of the application in at least one NSI obtained by the AF entity from the NSSF entity or the NWDAF entity, that is, if there is no NSI whose SLA support capability meets the subscribed SLA requirement of the application in the current network, a working mode of the application may be switched, and a working mode after switching meets the SLA support capability information of the NSI currently accessed by the terminal. For example, the AF entity may perform any one of actions (1) to (3):

(1) The AF entity determines to switch the working mode of the application to a target working mode, sends a mode switching notification to the terminal, and notifies the terminal to switch the working mode of the application to the target working mode. The mode switching notification includes an identifier of the target working mode.

For example, the AF entity may send the mode switching notification to the terminal via the AMF entity, or may send the mode switching notification to the terminal via the application server. This is not limited.

(2) The AF entity sends, to the terminal, indication information indicating that there is no NSI in the network meeting the subscribed SLA requirement of the application, and the terminal switches the working mode of the application to the target working mode based on the indication information or requests to establish a new PDU session based on the indication information.

(3) The AF entity sends, to the application server, indication information indicating that there is no NSI in the network meeting the subscribed SLA requirement of the application. The application server receives the indication information, determines to switch the working mode of the application to the target working mode, and sends, to the terminal, a mode switching notification that carries an identifier of the target working mode, to notify the terminal to switch the working mode of the application to the target working mode, or to request the terminal to establish a new PDU session.

The following describes, with reference to FIG. 4A to FIG. 8B, the foregoing possible implementations in detail using an example in which the specified location is a current location of the terminal and the target network is the DN 1.

FIG. 4A and FIG. 4B are flowcharts of another method for ensuring a service level agreement of an application according to an embodiment of this application. As shown in FIG. 4A and FIG. 4B, the method may include the following steps.

Step 401: An NSSF entity/NWDAF entity obtains SLA support capability information of each NSI in a network.

The NSSF entity/NWDAF entity may indicate the NSSF entity or the NWDAF entity. The NSSF entity may be the NSSF entity in FIG. 1, and the NWDAF entity may be the NWDAF entity (not shown) in the network shown in FIG. 1.

The network may be the network shown in FIG. 1. The SLA support capability information of the NSI is described above, and details are not described again.

The NSSF entity may obtain the SLA support capability information of each NSI in the network in either of the following manner 1 and manner 2.

Manner 1: The NSSF entity receives configuration information entered by an operator, and obtains the SLA support capability information of each NSI in the network from the configuration information.

For example, after deploying NSIs based on a subscription request of a customer, the operator performs a practical test on each NSI, determines the SLA support capability information of each NSI, and sends the SLA support capability information of each NSI to an OSS. The OSS sends, to the NSSF entity, the configuration information that carries the SLA support capability information of the NSI. The NSSF entity receives the configuration information, obtains the service SLA support capability information of the NSI from the configuration information, and configures the SLA support capability information of the NSI in the NSSF entity. The operator may obtain the SLA support capability information of each NSI through measurement according to other approaches. Details are not described.

The configuration information may include the SLA support capability information of each NSI in the network, and may further include correspondences between S-NSSAI and NSIs. This is not limited.

It should be noted that, in manner 1, the SLA support capability information of the NSI obtained by the NSSF entity can meet user requirements in all deployment areas of the NSI, that is, the service SLA support capability information of the NSI in all the deployment areas is the same.

Manner 2: The NSSF entity obtains running information of each network function entity in the NSI from an NRF entity, and determines the service SLA support capability information of the NSI based on the obtained running information.

The NRF entity may be an NRF entity in the NSI.

As shown in FIG. 1, the network function entity in the NSI may include an entity such as an SMF entity, a UPF entity, or a PCF entity. The running information of the network function entity may be used to indicate whether the network function entity runs normally.

That the NSSF entity determines the SLA support capability information of the NSI based on the obtained running information may include: if it is determined, based on the running information of the network function entity, that a fault occurs on the network function entity and affects service running performance, determining, by the NSSF entity, that the NSI cannot support a service of the service type, and setting an SLA support capability of the NSI to a lower level.

Manner 3: The NSSF entity obtains, from the NWDAF entity, terminal-related running data on each network function entity in the NSI and service load information of the NSI in each deployment area, and determines the SLA support capability information of the NSI based on the obtained running data and the service load information.

The terminal-related running data on the network function entity may include data such as a quantity of terminals supported by the network function entity and information indicating whether the terminals supported by the network function entity run normally.

That the NSSF entity determines the SLA support capability information of the NSI based on the obtained running data and the service load information may include: determining, by the NSSF entity, a congestion status of the NSI in the deployment area based on the terminal-related running data and the service load information on each network function entity; and determining the SLA support capability information of the NSI based on the congestion status of the NSI. For example, when the SMF entity in the NSI supports a relatively large quantity of terminals, it indicates that the NSI is in a congestion status in a service area of the SMF entity, and the SLA support capability in the deployment area is comparatively low.

The NWDAF entity may obtain the SLA support capability information of each NSI in the network in the foregoing manner 2 or manner 3. Details are not described again.

Step 402: An AF entity sends an event subscription request to the AMF entity, where the event subscription request is used to request to subscribe to a network access and mobility management event of the terminal.

When the AF entity is a function entity deployed by the operator, the AF entity directly sends the event subscription request to the AMF entity. When the AF entity is a function entity deployed by a third-party organization, the AF entity sends the event subscription request to a NEF entity. The NEF entity performs authentication and authorization on the request sent by the AF entity, and after the authentication and authorization succeed, the NEF entity sends the event subscription request to the AMF entity.

Step 403: The AMF entity sends an event subscription response to the AF entity, where the event subscription response is used to notify the AF entity that the event is subscribed successfully.

When the AF entity is a function entity deployed by the operator, the AMF entity directly sends the event subscription response to the AF entity. When the AF entity is a function entity deployed by the third-party organization, the AMF entity sends the event subscription response to the NEF entity, and the NEF entity sends the event subscription response to the AF entity.

Step 404: The AMF entity sends a terminal event notification message to the AF entity, where the event notification message includes location information of a current location of the terminal.

When the AF entity is a function entity deployed by the operator, the AMF entity directly sends the event notification message to the AF entity. When the AF entity is a function entity deployed by the third-party organization, the AMF entity sends the event notification message to the NEF entity, and the NEF entity sends the event notification message to the AF entity.

The AMF entity may periodically send the event notification message to the AF entity. Alternatively, once the AMF entity detects that a location area of the terminal changes, the AMF entity sends the event notification message to the AF entity. This is not limited.

Step 405: The AF entity receives the event notification message, and when the AF entity determines that SLA support capability information of an NSI currently accessed by the terminal does not meet a subscribed SLA requirement of an application between the current location and a DN 1, the AF entity sends a slice information request to the NSSF entity/NWDAF entity.

The slice information request may include information about a user, the location information of the current location, and an identifier of the DN 1. The slice information request may include information about a user, the location information of the specified location, an identifier of the DN 1, and subscribed S-NSSAI of the application.

For a manner in which the AF entity determines that the SLA support capability information of the NSI currently accessed by the terminal does not meet the subscribed SLA requirement of the application between the current location and the DN 1, refer to the solution in FIG. 3. Details are not described again.

When the AF entity is a function entity deployed by the operator, the AF entity directly sends the slice information request to the NSSF entity/NWDAF entity. When the AF entity is a function entity deployed by the third-party organization, the AF entity sends the slice information request to the NEF entity, and the NEF entity performs authentication and authorization on the slice information request sent by the AF entity. After the authentication and authorization succeed, the NEF entity sends the slice information request to the NSSF entity/NWDAF entity. For example, the AF entity sends the slice information request that carries S-NSSAI to the NEF entity, and the NEF entity determines whether the S-NSSAI included in the slice information request is included in the subscribed S-NSSAI of the application. If the S-NSSAI included in the slice information request is included in the subscribed S-NSSAI of the application, it indicates that a network slice corresponding to the S-NSSAI requested by the AF entity is in network slices subscribed to by the customer. In this case, the NEF entity sends the slice information request to the NSSF entity/NWDAF entity. If the S-NSSAI included in the slice information request is not included in the subscribed S-NSSAI of the application, the NEF entity does not send the slice information request to the NSSF entity/NWDAF entity, and returns failure information to the AF entity.

Step 406: The NSSF entity/NWDAF entity receives the slice information request, and sends a slice information response to the AF entity, where the slice information response includes SLA support capability information of at least one NSI between the current location and the DN 1.

The NSSF entity/NWDAF entity may directly send, to the AF entity, the SLA support capability information of the at least one NSI between the current location and the DN 1. Alternatively, the SLA support capability information of the at least one NSI between the current location and the DN 1 may be sent to the terminal by the NEF entity.

In addition, in step 406, the NSSF entity/NWDAF entity may further send other information of the NSI to the AF entity, for example, running information of the NSI (a current quantity of terminals in the NSI, traffic load, a congestion status, and the like). The NSSF entity/NWDAF entity may further send the correspondences between the S-NSSAI and the NSIs to the AF entity. This is not limited.

Step 407: The AF entity receives the slice information response sent by the NSSF entity/NWDAF entity.

The AF entity may directly receive the slice information response sent by the NSSF entity/NWDAF entity, or may receive, via the NEF entity, the slice information response sent by the NSSF entity/NWDAF entity. This is not limited.

Step 408: The AF entity obtains, from the SLA support capability information of the at least one NSI based on the slice information response, information about a first NSI that meets the subscribed SLA requirement of the application.

Step 409: The AF entity sends a notification message to the NEF entity.

The notification message is used to trigger establishment of a new PDU session. The notification message may include S-NSSAI corresponding to the first NSI, the information about the user, and an identifier of the application. Alternatively, the notification message includes S-NSSAI corresponding to the first NSI, the information about the user, an identifier of the application, and a service continuity mode indication. Alternatively, the notification message includes an NSSP, the information about the user, an identifier of the application, and a service continuity mode indication. Alternatively, the notification message includes an NSSP, the information about the user, and an identifier of the application. This is not limited. The NSSP is a rule for describing an application of the terminal and subscribed S-NSSAI of the application. The terminal may use the NSSP to determine which piece of subscribed S-NSSAI is used to establish a new session for the application.

The S-NSSAI corresponding to the first NSI may be determined by the AF entity based on the correspondences, obtained in step 406, between the S-NSSAI and the NSIs.

Step 410: The NEF entity performs authentication and authorization on the notification message sent by the AF entity.

Step 411: After the authentication and authorization succeed, the NEF entity sends the notification message to the AMF entity.

The AMF entity is an AMF entity with which the terminal registers, that is, an AMF entity that serves the terminal. The NEF entity may query a UDM entity to determine which AMF entity currently serves the terminal.

Optionally, the NEF entity sends the notification message to the AMF entity via non-access stratum (NAS) signaling. For example, the NEF entity may send the NAS signaling carrying the notification message to the AMF entity.

It should be noted that when the AF entity is a function entity deployed by the operator, step 409 and step 410 may be replaced by a step in which the AF entity directly sends the notification message to the AMF entity without forwarding by the NEF entity.

Step 412: The AMF entity receives the notification message, and sends a session establishment indication to the terminal based on the information about the user.

The session establishment indication may be used to indicate the terminal to establish a new PDU session. The session establishment indication may include the identifier of the application and the S-NSSAI corresponding to the first NSI. Alternatively, the session establishment indication may include the S-NSSAI corresponding to the first NSI, the identifier of the application, and the service continuity mode indication. Alternatively, the session establishment indication may include the NSSP, the identifier of an application, and the service continuity mode indication. Alternatively, the session establishment indication may include the NSSP and the identifier of the application. This is not limited.

Step 413: The terminal receives the session establishment indication, and sends, to the AMF entity, a session establishment request that carries the S-NSSAI corresponding to the first NSI, to establish a new PDU session.

A process of establishing a PDU session may include the following: The terminal sends, to the AMF entity, the session establishment request that carries the S-NSSAI corresponding to the first NSI. The AMF entity sends, to the NSSF entity, a slice selection request that carries the S-NSSAI corresponding to the first NSI. The NSSF entity receives the slice selection request, determines the first NSI based on the S-NSSAI corresponding to the first NSI, and sends, to the AMF entity, a slice selection response message that carries an ID of the first NSI. The AMF entity receives the slice selection response message, and selects, based on the ID of the first NSI, an SMF entity from the first NSI to establish a new PDU session. Until now, a PDU session is successfully established in a new network slice, and the terminal switches the application to the new PDU session.

Further, when the AF entity obtains, from the at least one NSI, no information about the first NSI whose SLA support capability information meets the subscribed SLA requirement in an SLA, the AF entity may perform any one of the foregoing actions (1) to (3). Details are not described again.

For example, if S-NSSAI 1 corresponds to an NSI-1, S-NSSAI 2 corresponds to NSI-2, S-NSSAI currently used by the application is the S-NSSAI 1, and the first NSI is the NSI-2, the AF entity determines that an NSI that meets the subscribed SLA requirement of the application is the NSI-2. In this case, the AF entity may send, to the AMF entity, a notification message that carries the identifier of the application, the information about the user using the application, and the S-NSSAI 2. After receiving the notification message, the AMF entity sends, to the terminal, a session establishment indication that carries the S-NSSAI 2 and the identifier of the application. The terminal receives the session establishment indication, and sends, to the AMF entity, a session establishment request that carries the S-NSSAI 2. The AMF entity sends, to the NSSF entity, a slice selection request that carries the S-NSSAI 2. The NSSF entity determines, based on a correspondence between the S-NSSAI 2 and the NSI-2, to select the NSI-2 to establish a new PDU session, and returns a selection result to the AMF entity, such that the AMF entity selects an SMF entity in the NSI-2 to establish a new PDU session.

It should be noted that in the solution shown in FIG. 4A and FIG. 4B, the notification message may further carry the ID of the first NSI. In step 412, the AMF entity may further store a correspondence between the ID of the first NSI and the S-NSSAI corresponding to the first NSI. In this case, the establishing a new PDU session in step 413 may include: receiving, by the AMF entity, the session establishment request that carries the S-NSSAI corresponding to the first NSI; directly determining the first NSI based on the correspondence; and selecting an SMF entity from the first NSI to establish a new PDU session.

For example, if the S-NSSAI 1 corresponds to the NSI-1, the S-NSSAI 2 corresponds to the NSI-2, the S-NSSAI currently used by the application is the S-NSSAI 1, and the first NSI is the NSI-2, the AF entity determines that the NSI that meets the subscribed SLA requirement of the application is the NSI-2. In this case, the AF entity may send, to the AMF entity, a notification message that carries the identifier of the application, the information about the user using the application, the S-NSSAI 2, and an identifier of the NSI-2. The AMF entity receives the notification message, and stores a correspondence between the S-NSSAI 2 and the NSI-2, and sends, to the terminal, a session establishment indication that carries the S-NSSAI 2 and the identifier of the application. After receiving the session establishment indication, the terminal sends, to the AMF entity, a session establishment request that carries the S-NSSAI 2. After receiving the session establishment request, the AMF entity determines the NSI-2 based on the stored correspondence between the S-NSSAI 2 and the NSI-2, and selects an SMF entity in the NSI-2 to establish a new PDU session.

FIG. 5A and FIG. 5B are flowcharts of still another method for ensuring a service level agreement of an application according to an embodiment of this application. As shown in FIG. 5A and FIG. 5B, the method may include the following steps.

Step 501 to step 508 are performed.

Step 501 is the same as step 401, step 502 is the same as step 402, step 503 is the same as step 403, step 504 is the same as step 404, step 505 is the same as step 405, step 506 is the same as step 406, step 507 is the same as step 407, and step 508 is the same as step 408. Details are not described again.

Step 509: An AF entity sends a notification message to a NEF entity.

The notification message is used to notify to update, using S-NSSAI corresponding to a first NSI, S-NSSAI corresponding to an application on a terminal, that is, update the S-NSSAI currently used by the application.

The notification message may include the S-NSSAI corresponding to the first NSI, and may further include an identifier of the application and information about a user using the application.

Step 510: The NEF entity performs authentication and authorization on the notification message sent by the AF entity.

For step 510, refer to the description in step 410. Details are not described again.

Step 511: After the authentication and authorization succeed, the NEF entity sends the notification message to an AMF entity.

For step 511, refer to the description in step 411. Details are not described again.

Step 512: The AMF entity sends a configuration update indication to the terminal based on the information about the user.

The configuration update indication is used to indicate the terminal to update the S-NSSAI corresponding to the application, where the configuration update indication includes the identifier of the application and the S-NSSAI corresponding to the first NSI.

Step 513: The terminal receives the configuration update indication, and updates the S-NSSAI corresponding to the application to the S-NSSAI corresponding to the first NSI.

Step 514: The terminal sends a configuration update response to the AMF entity.

The configuration update response is used to indicate that update of the S-NSSAI corresponding to the application on the terminal is completed.

Step 515: The AMF entity receives the configuration update response, and sends the configuration update response to the AF entity.

The AMF entity may directly send the configuration update response to the AF entity. Alternatively, the AMF entity sends the configuration update response to the AF entity via the NEF entity.

Step 516: The AF entity receives the configuration update response, and sends a session establishment indication to the terminal.

The session establishment indication may be used to indicate the terminal to establish a new PDU session, and the session establishment indication may include the identifier of the application.

The AF entity may send the session establishment indication to the terminal via the AMF entity. As shown in step 516.a, the AF entity sends NAS signaling carrying the session establishment indication to the AMF entity, and the AMF entity sends the session establishment indication to the terminal after receiving the notification message. Alternatively, as shown in step 516.b, the AF entity sends the session establishment indication to an application server, and the application server sends the session establishment indication to the terminal through a PDU session currently used by the application.

Step 517: The terminal receives the session establishment indication, and sends, to the AMF entity, a session establishment request that carries the S-NSSAI corresponding to the first NSI, to establish a new PDU session.

For step 517, refer to the description in step 413. Details are not described herein again.

Further, in the solution in FIG. 5A and FIG. 5B, when the AF entity obtains, from at least one NSI, no information about the first NSI whose SLA support capability information meets a subscribed SLA requirement in an SLA, the AF entity performs any one of the foregoing actions (1) to (3). Details are not described again.

For example, if S-NSSAI 1 corresponds to an NSI-1, S-NSSAI 2 corresponds to an NSI-2, the S-NSSAI currently used by the application is the S-NSSAI 1, and the first NSI is the NSI-2, the AF entity determines that an NSI that meets the subscribed SLA requirement of the application is the NSI-2. In this case, the AF entity may send, to the AMF entity, a notification message that carries the identifier of the application, the information about the user using the application, and the S-NSSAI 2. After receiving the notification message, the AMF entity sends, to the terminal, a configuration update indication that carries the S-NSSAI 2 and the identifier of the application. After receiving the configuration update indication, the terminal updates the S-NSSAI 1 currently used by the application to the S-NSSAI 2, and sends a configuration update response to the AF entity via the AMF entity. After receiving the configuration update response, the AF entity sends a session establishment indication to the terminal. The terminal receives the session establishment indication, and sends, to the AMF entity, a session establishment request that carries the S-NSSAI 2. The AMF entity sends, to an NSSF entity, a slice selection request that carries the S-NSSAI 2. The NSSF entity determines, based on a correspondence between the S-NSSAI 2 and the NSI-2, to select the NSI-2 to establish a new PDU session, and returns a selection result to the AMF entity such that the AMF entity selects an SMF entity in the NSI-2 to establish a new PDU session.

FIG. 6 is a flowchart of yet another method for ensuring a service level agreement of an application according to an embodiment of this application. As shown in FIG. 6, the method may include the following steps.

Step 601 to step 608 are performed.

Step 601 is the same as step 401, step 602 is the same as step 402, step 603 is the same as step 403, step 604 is the same as step 404, step 605 is the same as step 405, step 606 is the same as step 406, step 607 is the same as step 407, and step 608 is the same as step 408. Details are not described again.

Step 609: An AF entity sends a notification message to an AMF entity.

The notification message may be used to notify, using S-NSSAI corresponding to a first NSI, S-NSSAI corresponding to an application on a terminal, that is, update the S-NSSAI currently used by the application, and trigger establishment of a new PDU session (for example, notify the terminal to release a current PDU session and establish a new PDU session after the update is completed). The notification message may include the S-NSSAI corresponding to the first NSI, information about a user, and an identifier of the application.

The AF entity may directly send the notification message to the AMF entity. Alternatively, the AF entity sends the notification message to a NEF entity, and the NEF entity sends the notification message to the AMF entity. Before sending the notification message to the AMF entity, the NEF entity may perform authentication and authorization on the notification message sent by the AF entity. If the NEF entity determines that a configuration update and establishment of a new PDU session is allowed for the terminal, the NEF entity sends the notification message to the AMF entity. If the NEF entity determines that a configuration update and establishment of a new PDU session is not allowed for the terminal, the NEF entity does not send the notification message to the AMF entity. For a process in which the NEF entity performs authentication and authorization on the notification message sent by the AF entity, refer to the description in FIG. 4A and FIG. 4B. Details are not described again.

Step 610: The AMF entity sends a configuration update indication to the terminal.

The configuration update indication is used to indicate the terminal to update the S-NSSAI corresponding to the application, where the configuration update indication includes the identifier of the application and the S-NSSAI corresponding to the first NSI.

Step 611: The terminal receives the configuration update indication sent by the AMF entity, and updates the S-NSSAI that corresponds to the application and that is configured locally to the S-NSSAI corresponding to the first NSI.

Step 612: The terminal sends a configuration update response to the AMF entity.

The configuration update response is used to notify the AMF entity that the terminal completes the configuration update.

Step 613: The AMF entity receives the configuration update response, and sends the configuration update response to the AF entity.

The AMF entity may directly send the configuration update response to the AF entity. Alternatively, the AMF entity sends the configuration update response to the AF entity via the NEF entity. For example, the AMF entity sends the configuration update response to the NEF entity, and the NEF entity sends the configuration update response to the AF entity.

Step 614: The AMF entity sends a session establishment indication to the terminal, and sends, to an SMF entity, a notification for releasing an original PDU session.

The session establishment indication is used to indicate the terminal to release the original PDU session and establish a new PDU session.

The SMF entity is an SMF entity that serves the current PDU session.

Step 615: The terminal receives the session establishment indication, releases the original PDU session, and sends, to the AMF entity, a session establishment request carrying the S-NSSAI corresponding to the first NSI, to establish a new PDU session.

For step 615, refer to the description in step 413. Details are not described herein again.

It should be noted that step 613 and step 614 may be performed in a sequence shown in FIG. 6, or step 614 may be performed before step 613. This is not limited.

Further, in the solution in FIG. 6, when the AF entity obtains, from at least one NSI, no information about the first NSI whose SLA support capability information meets a subscribed SLA requirement in an SLA, the AF entity performs any one of the foregoing actions (1) to (3). Details are not described again.

For example, if S-NSSAI 1 corresponds to an NSI-1, S-NSSAI 2 corresponds to an NSI-2, the S-NSSAI currently used by the application is the S-NSSAI 1, and the first NSI is the NSI-2, the AF entity determines that an NSI that meets the subscribed SLA requirement of the application is the NSI-2. In this case, the AF entity may send, to the AMF entity, a notification message that carries the identifier of the application, the information about the user using the application, and the S-NSSAI 2, to notify the AMF entity to update the S-NSSAI corresponding to the application on the terminal, and establish a new PDU session. After receiving the notification message, the AMF entity sends, to the terminal, a configuration update indication that carries the S-NSSAI 2 and the identifier of the application. After receiving the configuration update indication, the terminal updates the S-NSSAI 1 currently used by the application to the S-NSSAI 2, and sends a configuration update response to the AF entity via the AMF entity. After the terminal completes the update, the AMF entity sends a session establishment indication to the terminal, to indicate the terminal to establish a new PDU session. The terminal receives the session establishment indication, and sends, to the AMF entity, a session establishment request that carries the S-NSSAI 2. The AMF entity sends, to an NSSF entity, a slice selection request that carries the S-NSSAI 2. The NSSF entity determines, based on a correspondence between the S-NSSAI 2 and the NSI-2, to select the NSI-2 to establish a new PDU session, and returns a selection result to the AMF entity such that the AMF entity selects an SMF entity in the NSI-2 to establish a new PDU session.

FIG. 7 is a flowchart of still yet another method for ensuring a service level agreement of an application according to an embodiment of this application. As shown in FIG. 7, the method may include the following steps.

Step 701 to step 708 are performed.

Step 701 is the same as step 401, step 702 is the same as step 402, step 703 is the same as step 403, step 704 is the same as step 404, step 705 is the same as step 405, step 706 is the same as step 406, step 707 is the same as step 407, and step 708 is the same as step 408. Details are not described again.

Step 709: An AF entity sends a notification message to a UDM entity.

The notification message may be used to notify the UDM entity to update an NSSP of a terminal.

The notification message may include information about a user using an application, an identifier of the application, and S-NSSAI corresponding to a first NSI.

The AF entity may directly send the notification message to the UDM entity. Alternatively, the AF entity sends the notification message to a NEF entity, and the NEF entity sends the notification message to the UDM entity. Before sending the notification message to the UDM entity, the NEF entity may further perform authentication and authorization on the notification message sent by the AF entity. If the NEF entity determines that the NSSP of the terminal is allowed to be updated, the NEF entity sends the notification message to the UDM entity. If the NEF entity determines that the NSSP of the terminal is not allowed to be updated, the NEF entity does not send the notification message to the UDM entity. For a process in which the NEF entity performs authentication and authorization on the notification message sent by the AF entity, refer to the description in FIG. 4A and FIG. 4B. Details are not described again.

Step 710: The UDM entity receives the notification message, updates the NSSP of the terminal based on the notification message, and sends an NSSP update indication to an AMF entity.

The NSSP update indication includes the information about the user and an updated NSSP. The UDM entity further sends an NSSP update response to the AF entity. The AMF entity is an AMF entity with which the terminal registers.

That the UDM entity updates the NSSP of the terminal based on the notification message may include: updating S-NSSAI that is associated with the application and that is specified in the NSSP to the S-NSSAI corresponding to the first NSI.

The UDM entity may directly send the NSSP update response to the AF entity, or send the NSSP update response to the AF entity via the NEF entity. This is not limited.

Step 711: The AMF entity receives the NSSP update indication, and sends the NSSP update indication to the terminal, and the terminal receives the NSSP update indication, and updates the NSSP of the terminal.

Step 712: The UDM entity sends the NSSP update response to the AF entity.

It should be noted that step 711 and step 712 may be performed in a sequence shown in FIG. 7, or step 712 may be performed before step 711. This is not limited.

Step 713: The AF entity receives the NSSP update response, and sends a session establishment indication to the terminal.

The session establishment indication may be used to indicate the terminal to establish a new PDU session, and the session establishment indication may include the identifier of the application.

The AF entity may send the session establishment indication to the terminal in step 713.a or step 713.b. Step 713.a is the same as step 516.a, and step 713.b is the same as step 516.b. Details are not described again.

Step 714: The terminal receives the session establishment indication, and sends, to the AMF entity, a session establishment request that carries the S-NSSAI corresponding to the first NSI, to establish a new PDU session.

For step 714, refer to the description in step 413. Details are not described herein again.

Further, in the solution in FIG. 7, when the AF entity obtains, from at least one NSI, no information about the first NSI whose SLA support capability information meets a subscribed SLA requirement in an SLA, the AF entity may perform any one of the foregoing actions (1) to (3). Details are not described again.

For example, if S-NSSAI 1 corresponds to an NSI-1, S-NSSAI 2 corresponds to an NSI-2, it is specified in the NSSP of the terminal that S-NSSAI corresponding to the application is the S-NSSAI 1, and the first NSI is the NSI-2, the AF entity determines that an NSI that meets the subscribed SLA requirement of the application is the NSI-2. In this case, the AF entity may send, to the UDM entity, a notification message that carries the S-NSSAI 2 corresponding to the NSI-2, the identifier of the application, and the information about the user, to notify the UDM entity to update the NSSP of the terminal. The UDM entity receives the notification message, and updates S-NSSAI 1 that corresponds to the application and that is specified in the NSSP of the terminal to the S-NSSAI 2. The UDM entity further sends, to the terminal, an NSSP update indication that carries an updated NSSP, and sends an NSSP update response to the AF entity. After receiving the NSSP update indication, the terminal updates the NSSP of the terminal. After receiving the NSSP update response, the AF entity sends a session establishment indication to the terminal. The terminal receives the session establishment indication, and sends, to the AMF entity based on the updated NSSP, a session establishment request that carries the S-NSSAI 2. The AMF entity sends, to an NSSF entity, a slice selection request that carries the S-NSSAI 2. The NSSF entity determines, based on a correspondence between the S-NSSAI 2 and the NSI-2, to select the NSI-2 to establish a new PDU session, and returns a selection result to the AMF entity. As such, the AMF entity selects an SMF entity in the NSI-2 to establish a new PDU session.

FIG. 8A and FIG. 8B are a flowchart of a further method for ensuring a service level agreement of an application according to an embodiment of this application. As shown in FIG. 8A and FIG. 8B, the method may include the following steps.

Step 801 to step 808 are performed.

Step 801 is the same as step 401, step 802 is the same as step 402, step 803 is the same as step 403, step 804 is the same as step 404, step 805 is the same as step 405, step 806 is the same as step 406, step 807 is the same as step 407, and step 808 is the same as step 408. Details are not described again.

Step 809: An AF entity sends a notification message to an NSSF entity.

The notification message may be used to notify the NSSF entity to specify an NSI for a terminal. The notification message includes an ID of a first NSI, information about a user using an application, and S-NSSAI currently used by the application.

The AF entity may directly send the notification message to the NSSF entity. Alternatively, the AF entity may send the notification message to a NEF entity, and the NEF entity sends the notification message to the NSSF entity. Before sending the notification message to the NSSF entity, the NEF entity may further perform authentication and authorization on the notification message sent by the AF entity. If the NEF entity determines that the AF entity allows to update the NSI that is specified for the terminal and that corresponds to the S-NSSAI, the NEF entity sends the notification message to the NSSF entity. If the NEF entity determines that the AF entity does not allow to update the NSI that is specified for the terminal and that corresponds to the S-NSSAI, the NEF entity does not send the notification message to the NSSF entity. For a process in which the NEF entity performs authentication and authorization on the notification message sent by the AF entity, refer to the description in FIG. 4A and FIG. 4B. Details are not described again.

Step 810: The NSSF entity receives the notification message, generates a slice selection control request record, and sends a slice selection control response to the AF entity.

The slice selection control request record may be used to record an association relationship between the information about the user, the S-NSSAI currently used by the application, and the first NSI.

The NSSF entity may directly send the slice selection control response to the AF entity, or may send the slice selection response to the AF entity via the NEF entity.

Step 811: The AF entity receives the slice selection control response, and sends a session establishment indication to the terminal.

The AF entity may send the session establishment indication to the terminal in step 811.a or step 811.b. Step 811.a is the same as step 516.a, and step 811.b is the same as step 516.b. Details are not described again.

Step 812: The terminal receives the session establishment indication, and sends, to the AMF entity, a session establishment request that carries the information about the user and the S-NSSAI currently used by the application. The AMF entity sends, to the NSSF entity, a slice selection request that carries the information about the user and the S-NSSAI currently used by the application.

Step 813: The NSSF entity receives the slice selection request, searches, based on the information about the user and the S-NSSAI currently used by the application, the slice selection control request record generated in step 810, selects the first NSI, and sends a slice selection result to the AMF entity.

The slice selection result may include the ID of the first NSI.

That the NSSF entity searches, based on the information about the user and the S-NSSAI currently used by the application, the slice selection control request record generated in step 810, and selects the first NSI may include the following: The NSSF entity first searches the slice selection control request record, and if the record includes S-NSSAI and an NSI that are associated with the information about the user, the NSSF entity determines to specify an NSI for the terminal identified by the information about the user. The NSSF entity further determines, based on the S-NSSAI and the NSI that are associated with the information about the user, that an NSI associated with the S-NSSAI currently used by the application is the first NSI, and selects the first NSI, to establish a new PDU session in the first NSI.

Step 814: The AMF entity establishes a new PDU session in the first NSI based on the slice selection result.

The AMF entity may select an SMF entity from the first NSI based on the ID of the first NSI, and send the session establishment request to the SMF entity, to establish a new PDU session.

Further, in the solution in FIG. 8A and FIG. 8B, when the AF entity obtains, from at least one NSI, no information about the first NSI whose SLA support capability information meets a subscribed SLA requirement in an SLA, the AF entity may perform any one of the foregoing actions (1) to (3). Details are not described again.

For example, if S-NSSAI 1 corresponds to an NSI-1, S-NSSAI 2 corresponds to an NSI-2, and S-NSSAI currently used by an application on a terminal 1 is the S-NSSAI 1, the AF entity determines that an NSI that meets a subscribed SLA requirement of the application is the NSI-2. In this case, the AF entity may send, to the NSSF entity, a notification message that carries an identifier of the terminal 1, the S-NSSAI 1, and the NSI-2, to notify the NSSF entity to select an NSI for the terminal 1. The NSSF entity receives the notification message, records an association relationship between the terminal 1, the S-NSSAI 1, and the NSI 2, and sends a slice selection response to the AF entity. The AF entity receives the slice selection response, and sends a session establishment indication to the terminal. The terminal receives the session establishment indication, and sends, to the AMF entity, a session establishment request that carries the identifier of the terminal 1 and the S-NSSAI 1 currently used by the application. The AMF entity sends, to the NSSF entity, a slice selection request that carries the identifier of the terminal 1 and the S-NSSAI 1 currently used by the application. The NSSF entity determines, based on the identifier of the terminal 1 and the recorded association relationship between the terminal 1, the S-NSSAI 1, and the NSI-2, to select an NSI for the terminal 1, where the NSI is the NSI-2, and returns a selection result to the AMF entity. As such, the AMF entity selects an SMF entity in the NSI-2 to establish a new PDU session.

The foregoing embodiments describe a process in which the AF entity ensures an SLA of an application. In another feasible solution, an application server may ensure the SLA of the application. For example, the application server may obtain, via the AF entity, SLA support capability information of NSIs between a specified location and a target network, and take a corresponding measure (establishing a new PDU session or switching a working mode) based on the obtained SLA support capability information of the NSIs to ensure a service level of the application. For the implementation, refer to FIG. 9.

Figure 9:
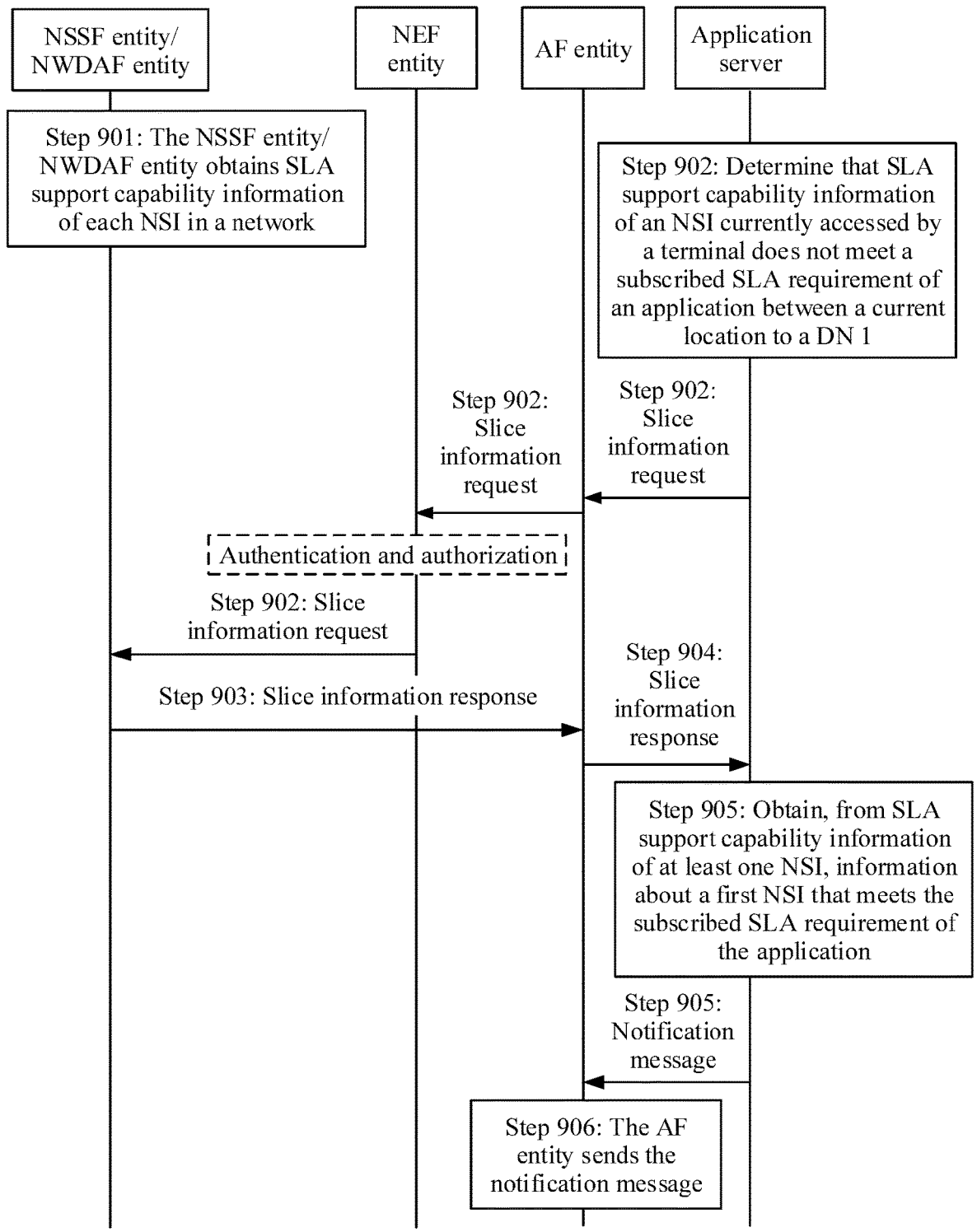
FIG. 9 is a flowchart of a still further another method for ensuring a service level agreement of an application according to an embodiment of this application.

FIG. 9 is a flowchart of a still further method for ensuring a service level agreement of an application according to an embodiment of this application. As shown in FIG. 9, the method may include the following steps.

Step 901: An NSSF entity/NWDAF entity obtains SLA support capability information of each NSI in a network.

For step 901, refer to the description in step 401. Details are not described again.

Step 902: When determining that SLA support capability information of an NSI currently accessed by a terminal does not meet a subscribed SLA requirement of an application between a current location and a DN 1, an application server sends a slice information request to an AF entity, and the AF entity sends the slice information request to the NSSF entity/NWDAF entity.

The slice information request may include information about a user using the application, location information of the current location, and an identifier of the DN 1. Alternatively, the slice information request may include information about a user using the application, location information of the current location, an identifier of the DN 1, and subscribed S-NSSAI of the application.

The application server may obtain the location information of the current location of the terminal via the AF entity. For example, the application server may send a location information request to the AF entity to request the location information of the current location of the terminal. The AF entity receives the location information request, obtains the location information of the current location of the terminal through steps 402 to 404, and sends the location information of the current location to the application server.

Step 903: The NSSF entity/NWDAF entity receives the slice information request, and sends a slice information response to the AF entity, where the slice information response includes SLA support capability information of at least one NSI between the current location and the DN 1.

Step 904: The AF entity receives the slice information response sent by the NSSF entity/NWDAF entity, and sends the slice information response to the application server.

Step 905: The application server entity obtains, from the SLA support capability information of the at least one NSI based on the slice information response, information about a first NSI that meets the subscribed SLA requirement of the application, and sends a notification message to the AF entity.

The notification message is similar to the notification message in step 302, and may include the information about the first NSI (an identifier of the first NSI, S-NSSAI corresponding to the first NSI, and the like). Details are not described again.

Step 906: The AF entity sends the notification message, to establish a new PDU session.

For step 906, refer to the description in step 302. Details are not described again.

Further, when the AF entity obtains, from the at least one NSI, no information about the first NSI whose SLA support capability information meets the subscribed SLA requirement in an SLA, the application server determines to switch a working mode of the application to a target working mode, and sends a mode switching notification to the terminal, to notify the terminal to switch the working mode of the application to the target working mode. The mode switching notification includes an identifier of the target working mode.

Alternatively, the application server sends, to the terminal, indication information indicating that there is no NSI in the network meeting the subscribed SLA requirement of the application, and the terminal switches the working mode of the application to the target working mode based on the indication information or requests to establish a new PDU session based on the indication information.

The foregoing mainly describes the solutions provided in the embodiments of this application from a perspective of interaction between the network elements. It may be understood that, to implement the foregoing functions, the AF entity, the terminal, and the network side entity (the NSSF entity or the NWDAF entity) include corresponding hardware structures and/or software modules for performing the functions. A person skilled in the art should be aware that, in combination with the examples described in the embodiments disclosed in this specification, units and algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the AF entity, the terminal, and the network side entity may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, module division is an example, and is merely a logical function division. In actual implementation, another division manner may be used.

Figure 10:
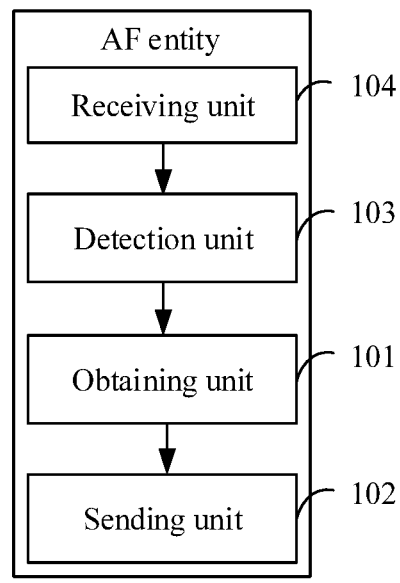
FIG. 10 is a schematic composition diagram of an AF entity according to an embodiment of this application.

When the function modules are obtained through division based on the corresponding functions, FIG. 10 is a possible schematic composition diagram of an AF entity in the foregoing embodiment. As shown in FIG. 10, the AF entity may include an obtaining unit 101, a sending unit 102, a detection unit 103, and a receiving unit 104.

The obtaining unit 101 is configured to obtain information about a first NSI that is in network slice instances between a specified location and a target network and whose SLA support capability meets a subscribed SLA requirement of an application.

The sending unit 102 is configured to send a notification message including the information about the first NSI.

The detection unit 103 is configured such that before the obtaining unit 101 obtains the information about the first NSI that is in the network slice instances (NSIs) between the specified location and the target network and whose SLA support capability meets the subscribed SLA requirement of the application, detection unit 103: detects that an SLA support capability of an NSI currently accessed by the terminal does not meet the subscribed SLA requirement of the application between the specified location and the target network; or detects that the terminal moves.

The receiving unit 104 is configured to receive an SLA assurance request sent by an application server, where the SLA assurance request is used to request the AF entity to ensure a service level of the application, and the SLA assurance request includes a subscribed SLA of the application.

In a possible design, the obtaining unit 101 is configured to: send a slice information request to a network side entity; receive a slice information response sent by the network side entity, where the slice information response includes SLA support capability information of at least one NSI between the specified location and the target network; and obtain, from the SLA support capability information of the at least one NSI based on the subscribed SLA of the application and the SLA support capability information of the at least one NSI, the information about the first NSI that meets the subscribed SLA requirement of the application.

In another possible design, the information about the first NSI includes an ID of the first NSI and S-NSSAI corresponding to the first NSI. The notification message is used to trigger establishment of a new PDU session. The sending unit 102 is configured to send the notification message to the AMF entity.

In still another possible design, the information about the first NSI is the S-NSSAI corresponding to the first NSI, and the notification message is used to notify to update, using the S-NSSAI corresponding to the first NSI, S-NSSAI corresponding to the application on the terminal, and trigger establishment of a new PDU session. The notification message further includes information about a user and an identifier of the application. The sending unit 102 is configured to send the notification message to an AMF entity.

In yet another possible design, the information about the first NSI is the S-NSSAI corresponding to the first NSI, and the notification message is used to notify to update, using the S-NSSAI corresponding to the first NSI, the S-NSSAI corresponding to the application on the terminal. The notification message further includes the information about the user and the identifier of the application. The sending unit 102 is configured to send the notification message to the AMF entity.

In still yet another possible design, the information about the first NSI is the S-NSSAI corresponding to the first NSI, and the notification message is used to notify to update an NSSP of the terminal. The notification message further includes the information about the user and the identifier of the application. The sending unit 102 is configured to send the notification message to a unified data management UDM entity.

In a further possible design, the information about the first NSI is the ID of the first NSI, and the notification message is used to notify an NSSF entity to specify an NSI for the terminal. The notification message further includes the information about the user and S-NSSAI currently used by the application. The sending unit 102 is configured to send the notification message to the NSSF entity.

In a still further possible design, the sending unit 102 is further configured to trigger, via the AMF entity or the application server, the terminal to re-establish a PDU session.

In a yet further possible design, the sending unit 102 is further configured such that when the AF entity determines that no NSI between the specified location and the target network meets the subscribed SLA requirement of the application, the sending unit 102 sends a mode switching notification to the terminal. The mode switching notification comprises an identifier of a target working mode or indication information indicating that there is no NSI meeting the subscribed SLA requirement of the application.

It should be noted that all related content of the steps in the foregoing method embodiments may be cited in function descriptions of corresponding function modules. Details are not described herein again. The AF entity provided in this embodiment of this application is configured to perform the foregoing method for ensuring a service level agreement of an application, and therefore can achieve a same effect as the foregoing method for ensuring a service level agreement of an application.

When an integrated unit is used, the AF entity may include a processing module and a communications module. The processing module is configured to control and manage an action of the AF entity. The communications module is configured to support the AF entity in communication with another network entity, for example, communication with a function module or a network entity shown in FIG. 1. The AF entity may further include a storage module configured to store program code and data of a server. The processing module may be a processor or a controller. The controller/processor may implement or execute various example logical blocks, modules, and circuits described with reference to content disclosed in the present disclosure. Alternatively, the processor may be a combination of processors implementing a computing function, for example, a combination of one or more microprocessors, or a combination of a DSP and a microprocessor. The communications module may be a transceiver, a transceiver circuit, a communications interface, or the like. The storage module may be a memory.

When the processing module is a processor, the communications module is a communications interface, and the storage module is a memory, the AF entity in this embodiment of this application may be the communications device shown in FIG. 2.

Figure 11:
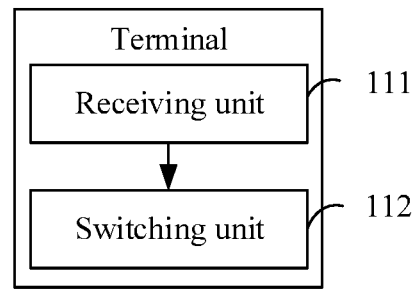
FIG. 11 is a schematic composition diagram of a terminal according to an embodiment of this application.

When the function modules are obtained through division based on the corresponding functions, FIG. 11 is a possible schematic composition diagram of the terminal in the foregoing embodiment. As shown in FIG. 11, the terminal may include a receiving unit 111 and a switching unit 112.

The receiving unit 111 is configured to receive a mode switching notification.

The switching unit 112 is configured to switch a working mode of an application to a target working mode based on the mode switching notification received by the receiving unit 111.

In another possible design, the mode switching notification carries an identifier of the target working mode or indication information indicating that there is no NSI meeting a subscribed SLA requirement of the application.

In still another possible design, the receiving unit 111 is configured to receive the mode switching notification sent by an AF entity or an application server.

It should be noted that all related content of the steps in the foregoing method embodiments may be cited in function descriptions of corresponding function modules. Details are not described herein again. The terminal provided in this embodiment of this application is configured to perform the foregoing method for ensuring a service level agreement of an application, and therefore can achieve a same effect as the foregoing method for ensuring a service level agreement of an application.

When an integrated unit is used, the terminal may include a processing module and a communications module. The processing module is configured to control and manage an action of the terminal. The communications module is configured to support the terminal in communication with another network entity, for example, communication with a function module or a network entity shown in FIG. 1. The terminal may further include a storage module configured to store program code and data of a server. The processing module may be a processor or a controller. The controller/processor may implement or execute various example logical blocks, modules, and circuits described with reference to content disclosed in the present disclosure. Alternatively, the processor may be a combination of processors implementing a computing function, for example, a combination of one or more microprocessors, or a combination of a DSP and a microprocessor. The communications module may be a transceiver, a transceiver circuit, a communications interface, or the like. The storage module may be a memory.

When the processing module is a processor, the communications module is a communications interface, and the storage module is a memory, the AF entity in this embodiment of this application may be the communications device shown in FIG. 2.

Figure 12:
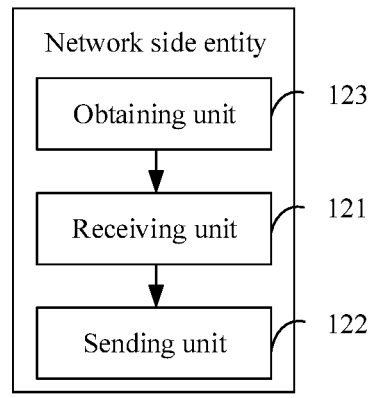
FIG. 12 is a schematic composition diagram of a network side entity according to an embodiment of this application.

When the function modules are obtained through division based on the corresponding functions, FIG. 12 is a possible schematic composition diagram of a network side entity in the foregoing embodiment. As shown in FIG. 12, the network side entity may include a receiving unit 121, a sending unit 122, and an obtaining unit 123.

The receiving unit 121 is configured to receive a slice information request sent by an AF entity.

The sending unit 122 is configured to send a slice information response to the AF entity, where the slice information response includes SLA support capability information of at least one network slice instance between a specified location and a target network.

In another possible design, the network side entity is an NSSF entity. The obtaining unit 123 is configured to: before the receiving unit 121 receives the slice information request sent by the AF entity, receive configuration information entered by an operator, and obtain SLA support capability information of each NSI in a network from the configuration information, where the configuration information includes the SLA support capability information of each NSI in the network; or obtain, from an NWDAF entity, terminal-related running data on each network function entity in each NSI in a network and service load information of the NSI in each deployment area, and determine SLA support capability information of the NSI based on the obtained running data and the service load information; or obtain running information of each network function entity in the NSI from a network repository function (NRF) entity in the NSI, and determine SLA support capability information of the NSI based on the running information.

In still another possible design, the network side entity is the NWDAF entity. The obtaining unit 123 is configured to: before the slice information request sent by the AF entity is received, collect terminal-related running data on each network function entity in the NSI and service load information of the NSI in each deployment area, and determine SLA support capability information of the NSI based on the obtained running data and the service load information; or obtain running information of each network function entity in the NSI from a network repository function (NRF) entity in the NSI, and determine SLA support capability information of the NSI based on the running information.

It should be noted that all related content of the steps in the foregoing method embodiments may be cited in function descriptions of corresponding function modules. Details are not described herein again. The network side entity provided in this embodiment of this application is configured to perform the foregoing method for ensuring a service level agreement of an application, and therefore can achieve a same effect as the foregoing method for ensuring a service level agreement of an application.

When an integrated unit is used, the network side entity may include a processing module and a communications module. The processing module is configured to control and manage an action of the network side entity. The communications module is configured to support the network side entity in communication with another network entity, for example, communication with a function module or a network entity shown in FIG. 1. The network side entity may further include a storage module configured to store program code and data of a server. The processing module may be a processor or a controller. The controller/processor may implement or execute various example logical blocks, modules, and circuits described with reference to content disclosed in the present disclosure. Alternatively, the processor may be a combination of processors implementing a computing function, for example, a combination of one or more microprocessors, or a combination of a DSP and a microprocessor. The communications module may be a transceiver, a transceiver circuit, a communications interface, or the like. The storage module may be a memory.

When the processing module is a processor, the communications module is a communications interface, and the storage module is a memory, the AF entity in this embodiment of this application may be the communications device shown in FIG. 2.

All or some of the foregoing embodiments may be implemented using software, hardware, firmware, or any combination thereof. When a software program is used to implement the embodiments, the embodiments may be implemented completely or partially in a form of a computer program product. The computer program product includes one or more computer instructions. When the computer instructions are loaded and executed on a computer, the procedure or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to example features and the embodiments thereof, certainly, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Certainly, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A system for ensuring a service level agreement (SLA) of an application, the system comprising:

an application function entity comprising a first processor and a first memory configured to store first instructions executable by the first processor to cause the application function entity to:
  send a slice information request, wherein the slice information request comprises location information of a specified location of a terminal; and
  receive a slice information response, wherein the slice information response comprises SLA support capability information of at least one network slice instance (NSI) between the specified location of the terminal and a target data network; and
a network side entity comprising a second processor and a second memory configured to store second instructions executable by the second processor to cause the network side entity to:
  receive the slice information request from the application function entity; and
  send the slice information response to the application function entity.

2. The system according to claim 1, wherein the slice information request comprises location information of the specified location of the terminal and an identifier of the target data network.

3. The system according to claim 1, wherein the slice information request comprises location information of the specified location of the terminal, an identifier of the target data network, and subscribed single network slice selection assistance information (S-NSSAI) of the application.

4. The system according to claim 1, wherein the SLA support capability information comprises at least one of: a service type supported by the NSI, a maximum quantity of terminals supported by the service type, a maximum allowed bandwidth ensured by the service type, a maximum end-to-end network delay ensured by the service type, a maximum terminal movement rate allowed by the service type, a reliability level of the service type, or a service continuity mode supported by the service type.

5. The system according to claim 1, wherein the application function entity is further configured to detect that an SLA support capability of an NSI currently accessed by the terminal does not meet a subscribed SLA requirement of the application between the specified location of the terminal and the target data network.

6. The system according to claim 1, wherein the application function entity is further configured to receive a capability notification message from an application server, wherein the capability notification message indicates that an SLA support capability of an NSI currently accessed by the terminal does not meet a subscribed SLA requirement of the application between the specified location of the terminal and the target data network.

7. The system according to claim 1, wherein the application function entity is further configured to receive an SLA assurance request from an application server, wherein the SLA assurance request requests the application function entity to ensure a service level of the application, and wherein the SLA assurance request comprises a subscribed SLA requirement of the application.

8. The system according to claim 7, wherein the application function entity is further configured to:
  obtain, from the at least one NSI based on the subscribed SLA requirement of the application and the SLA support capability information, information about a first NSI whose SLA support capability meets the subscribed SLA requirement of the application; and send a session establishment notification message to an access and mobility management entity based on the information about the first NSI, wherein the session establishment notification message triggers establishment of a new protocol data unit (PDU) session in the first NSI.

9. The system according to claim 8, wherein the session establishment notification message comprises single network slice selection assistance information (S-NSSAI) corresponding to the first NSI.

10. A method for ensuring a service level agreement (SLA) of an application, the method comprising:
receiving, by a network side entity, a slice information request from an application function entity, wherein the slice information request comprises location information of a specified location of a terminal; and
sending, by the network side entity, a slice information response to the application function entity,
wherein the slice information response comprises SLA support capability information of at least one network slice instance (NSI) between the specified location of the terminal and a target data network.

11. The method according to claim 10, wherein the slice information request comprises location information of the specified location of the terminal and an identifier of the target data network.

12. The method according to claim 10, wherein the slice information request comprises location information of the specified location of the terminal, an identifier of the target data network and subscribed single network slice selection assistance information (S-NSSAI) of the application.

13. The method according to claim 10, wherein the SLA support capability information comprises at least one of a service type supported by the NSI, a maximum quantity of terminals supported by the service type, a maximum allowed bandwidth ensured by the service type, a maximum end-to-end network delay ensured by the service type, a maximum terminal movement rate allowed by the service type, a reliability level of the service type, or a service continuity mode supported by the service type.

14. The method according to claim 10, wherein the network side entity is a network data analytics function entity.

15. The method according to claim 10, further comprising:
obtaining, by the network side entity, running information of each network function entity in each of the at least one NSI from a network repository function (NRF) entity; and
determining, by the network side entity, the SLA support capability information based on the running information.

16. A network side entity, comprising:
at least one processor; and
a memory coupled to the at least one processor and having instructions stored thereon which, when executed by the at least one processor, cause the network side entity to:
receive a slice information request from an application function entity, wherein the slice information request comprises location information of a specified location of a terminal; and
send a slice information response to the application function entity,
wherein the slice information response comprises service level agreement (SLA) support capability information of at least one network slice instance (NSI) between the specified location of the terminal and a target data network.

17. The network side entity according to claim 16, wherein the slice information request comprises location information of the specified location of the terminal and an identifier of the target data network.

18. The network side entity according to claim 16, wherein the slice information request comprises location information of the specified location of the terminal, an identifier of the target data network, and subscribed single network slice selection assistance information (S-NSSAI) of an application.

19. The network side entity according to claim 16, wherein the SLA support capability information comprises at least one of: a service type supported by the NSI, a maximum quantity of terminals supported by the service type, a maximum allowed bandwidth ensured by the service type, a maximum end-to-end network delay ensured by the service type, a maximum terminal movement rate allowed by the service type, a reliability level of the service type, or a service continuity mode supported by the service type.

20. The network side entity according to claim 16, wherein execution of the instructions by the at least one processor further causes the network side entity to:
obtain running information of each network function entity in each of the at least one NSI from a network repository function entity; and
determine the SLA support capability information based on the running information.

21. A method for ensuring a service level agreement (SLA) of an application, the method comprising:
sending, by an application function entity, a slice information request to a network side entity, wherein the slice information request comprises location information of a specified location of a terminal;
receiving, by the network side entity, the slice information request from the application function entity;
sending, by the network side entity, a slice information response to the application function entity, wherein the slice information response comprises SLA support capability information of at least one network slice instance (NSI) between the specified location of the terminal and a target data network; and
receiving, by the application function entity, the slice information response from the network side entity.

22. The method according to claim 21, wherein the slice information request comprises location information of the specified location of the terminal and an identifier of the target data network.

23. The method according to claim 21, wherein the slice information request comprises location information of the specified location of the terminal, an identifier of the target data network, and subscribed single network slice selection assistance information (S-NSSAI) of the application.

24. The method according to claim 21, wherein the SLA support capability information comprises at least one of: a service type supported by the NSI, a maximum quantity of terminals supported by the service type, a maximum allowed bandwidth ensured by the service type, a maximum end-to-end network delay ensured by the service type, a maximum terminal movement rate allowed by the service type, a reliability level of the service type, or a service continuity mode supported by the service type.

25. The method according to claim 21, wherein the network side entity is a network data analytics function entity.

26. The method according to claim 21, further comprising:
 obtaining, by the network side entity, running information of each network function entity in each of the at least one NSI from a network repository function (NRF) entity; and
 determining, by the network side entity, the SLA support capability information based on the running information.

27. The method according to claim 21, further comprising:
 detecting, by the application function entity, that an SLA support capability of an NSI currently accessed by the terminal does not meet a subscribed SLA requirement of the application between the specified location of the terminal and the target data network;
 or
 receiving, by the application function entity, a capability notification message from an application server, wherein the capability notification message indicates that an SLA support capability of an NSI currently accessed by the terminal does not meet a subscribed SLA requirement of the application between the specified location of the terminal and the target data network.

28. The method according to claim 21, further comprising receiving, by the application function entity, an SLA assurance request from an application server, wherein the SLA assurance request requests the application function entity to ensure a service level of the application, and wherein the SLA assurance request comprises a subscribed SLA requirement of the application.

29. The method according to claim 28, further comprising:
 obtain, by the application function entity, from the at least one NSI based on the subscribed SLA requirement of the application and the SLA support capability information, information about a first NSI whose SLA support capability meets the subscribed SLA requirement of the application; and
 sending, by the application function entity, a session establishment notification message to an access and mobility management entity based on the information about the first NSI, wherein the session establishment notification message triggers establishment of a new protocol data unit (PDU) session in the first NSI.

30. The method according to claim 29, wherein the session establishment notification message comprises single network slice selection assistance information (S-NSSAI) corresponding to the first NSI.

* * * * *